(12) United States Patent
Glebov et al.

(10) Patent No.: US 6,922,508 B2
(45) Date of Patent: Jul. 26, 2005

(54) OPTICAL SWITCHING APPARATUS WITH ADIABATIC COUPLING TO OPTICAL FIBER

(75) Inventors: Alexei Glebov, San Bruno, CA (US); Shinya Sasaki, San Jose, CA (US); Michael Lee, San Jose, CA (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/123,817

(22) Filed: Apr. 15, 2002

(65) Prior Publication Data

US 2003/0035632 A1 Feb. 20, 2003

Related U.S. Application Data

(63) Continuation-in-part of application No. 09/932,526, filed on Aug. 17, 2001.

(51) Int. Cl.[7] .................................................. G02B 3/19
(52) U.S. Cl. .......................................... 385/43; 385/49
(58) Field of Search .......................... 385/43, 129–132, 385/49, 16

(56) References Cited

U.S. PATENT DOCUMENTS

| | | | | |
|---|---|---|---|---|
| 4,740,951 A | * | 4/1988 | Lizet et al. .................... 398/87 |
| 4,790,620 A | * | 12/1988 | Niwayama ..................... 385/31 |
| 4,850,044 A | | 7/1989 | Block et al. ................. 455/607 |
| 5,010,505 A | | 4/1991 | Falk et al. .................... 364/713 |
| 5,054,872 A | | 10/1991 | Fan et al. ..................... 385/130 |
| 5,093,890 A | | 3/1992 | Bregman et al. ............. 385/146 |
| 5,103,494 A | | 4/1992 | Mozer .......................... 385/14 |
| 5,204,866 A | | 4/1993 | Block et al. .................. 372/27 |
| 5,218,654 A | | 6/1993 | Auter ............................ 385/24 |
| 5,220,582 A | | 6/1993 | Kaharu et al. ................ 375/55 |
| 5,253,319 A | * | 10/1993 | Bhagavatula ................ 385/129 |
| 5,375,184 A | | 12/1994 | Sullivan ....................... 385/129 |
| 5,408,568 A | | 4/1995 | Hamilton ..................... 385/132 |
| 5,439,782 A | * | 8/1995 | Haemmerle et al. ........ 430/321 |
| 5,465,860 A | | 11/1995 | Fujimoto et al. ............. 216/24 |
| 5,488,678 A | | 1/1996 | Taneya et al. ................ 385/14 |
| 5,511,142 A | * | 4/1996 | Horie et al. ................. 385/129 |
| 5,515,464 A | * | 5/1996 | Sheem ......................... 385/49 |
| 5,540,346 A | | 7/1996 | Fujimoto et al. ............. 216/24 |
| 5,541,039 A | | 7/1996 | McFarland et al. ......... 430/290 |
| 5,572,540 A | | 11/1996 | Cheng .......................... 372/50 |
| 5,729,643 A | * | 3/1998 | Hmelar et al. ................ 385/43 |
| 5,732,177 A | | 3/1998 | Deacon et al. .............. 385/122 |
| 5,757,989 A | | 5/1998 | Yoshinura et al. ............ 385/14 |
| 5,822,475 A | | 10/1998 | Hirota et al. .................. 385/24 |
| 5,835,646 A | | 11/1998 | Yoshimura et al. ........... 385/14 |
| 5,854,868 A | | 12/1998 | Yoshimura et al. ........... 385/50 |
| 5,894,538 A | | 4/1999 | Presby ........................ 385/129 |
| 5,910,012 A | * | 6/1999 | Takeuchi ....................... 438/31 |
| 5,978,524 A | | 11/1999 | Bischel et al. ................. 385/4 |
| 6,003,222 A | * | 12/1999 | Barbarossa ................... 29/600 |
| 6,137,625 A | * | 10/2000 | Salet et al. .................. 359/344 |
| 6,141,465 A | | 10/2000 | Bischel et al. ................. 385/4 |
| 6,181,722 B1 | * | 1/2001 | Dutting et al. ................ 372/45 |
| 6,314,228 B1 | * | 11/2001 | Korenaga et al. ........... 385/129 |
| 6,336,749 B1 | * | 1/2002 | O'Toole et al. .............. 385/96 |

FOREIGN PATENT DOCUMENTS

| | | |
|---|---|---|
| JP | 2001-40006 | 2/2001 |
| JP | 2001-56009 | 2/2001 |

* cited by examiner

*Primary Examiner*—Joseph Williams
*Assistant Examiner*—Dalei Dong
(74) *Attorney, Agent, or Firm*—Sheppard Mullin Richter & Hampton LLP

(57) ABSTRACT

An optical coupling structure useful in optical switching devices is described. The optical coupling structure includes a core layer for guiding a light beam exiting a core layer of an optical fiber into a slab waveguide layer. The core layer of the optical coupling structure avoids a power loss of a light beam and establishes an adiabatic coupling. The core layer of the optical coupling structure may have a tapered surface.

18 Claims, 16 Drawing Sheets

Optical Switch Module

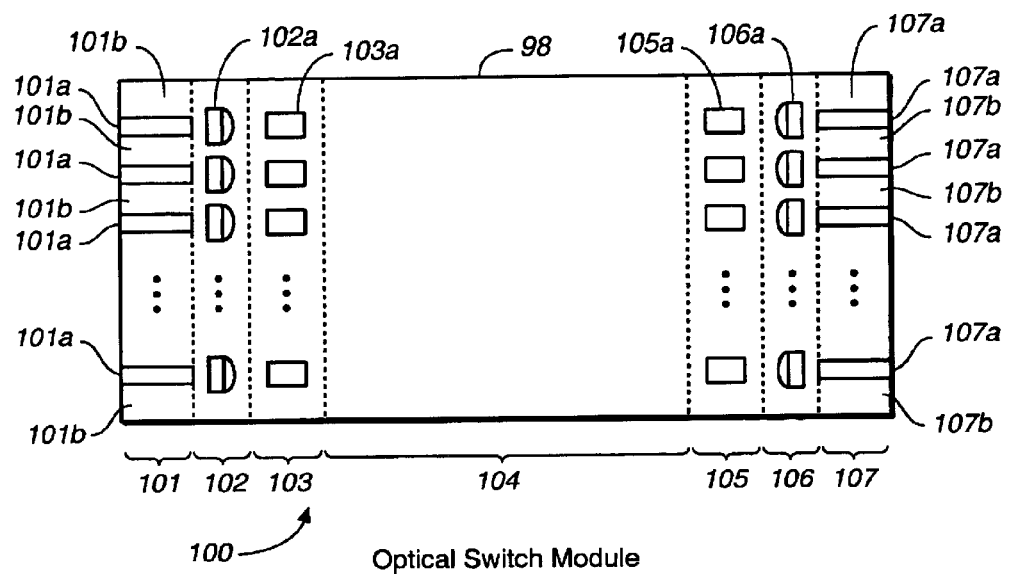
FIG._1
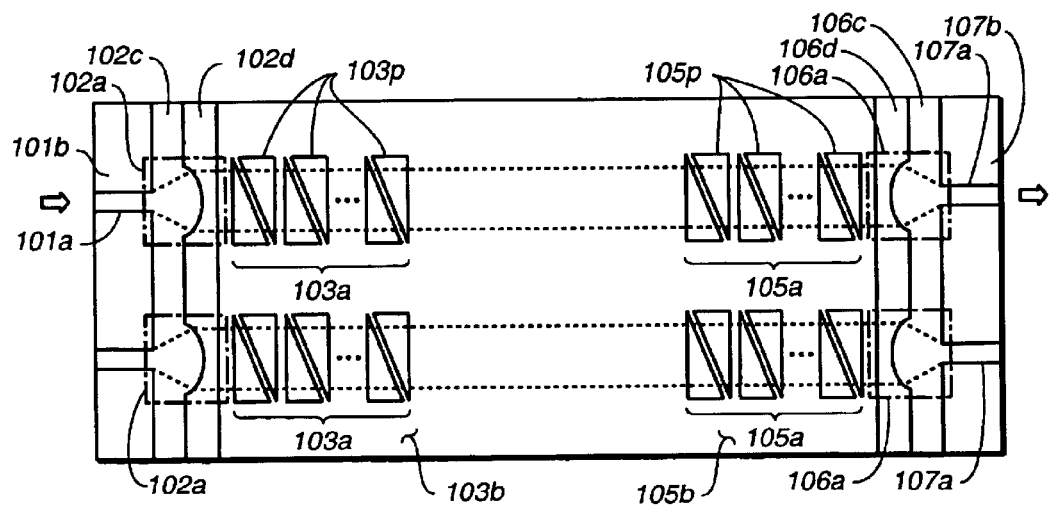
FIG._2

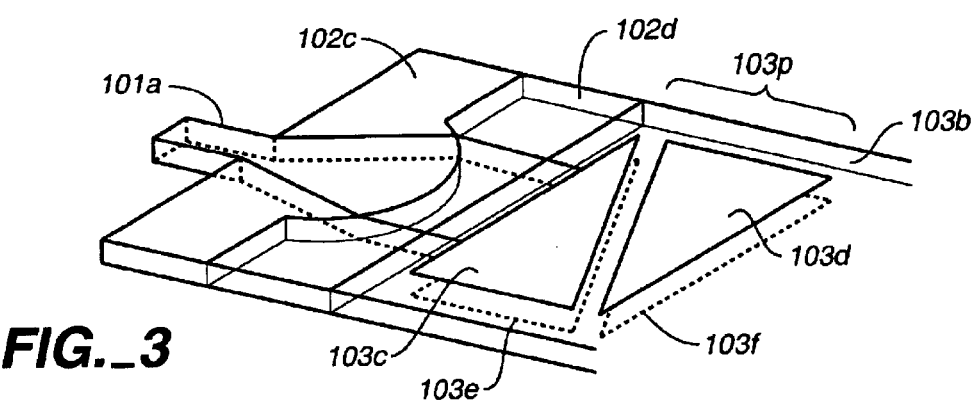
FIG._3
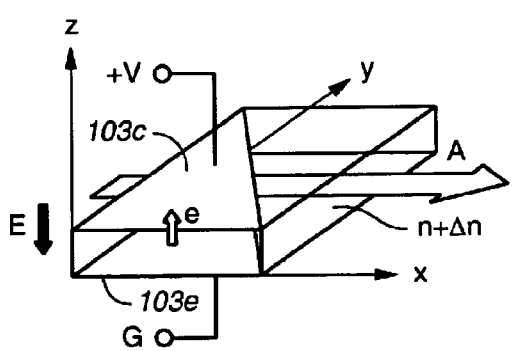
FIG._4A
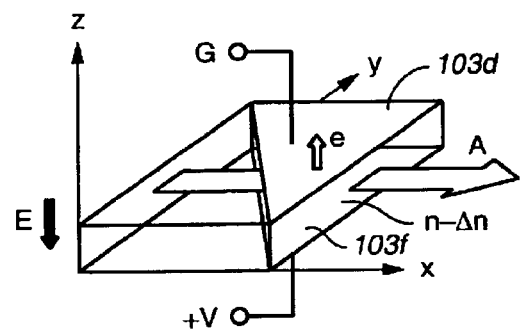
FIG._4B
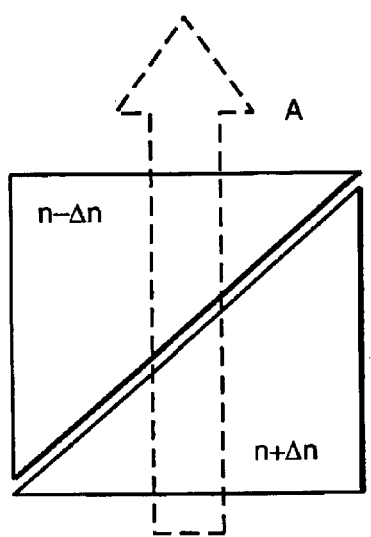
FIG._4C

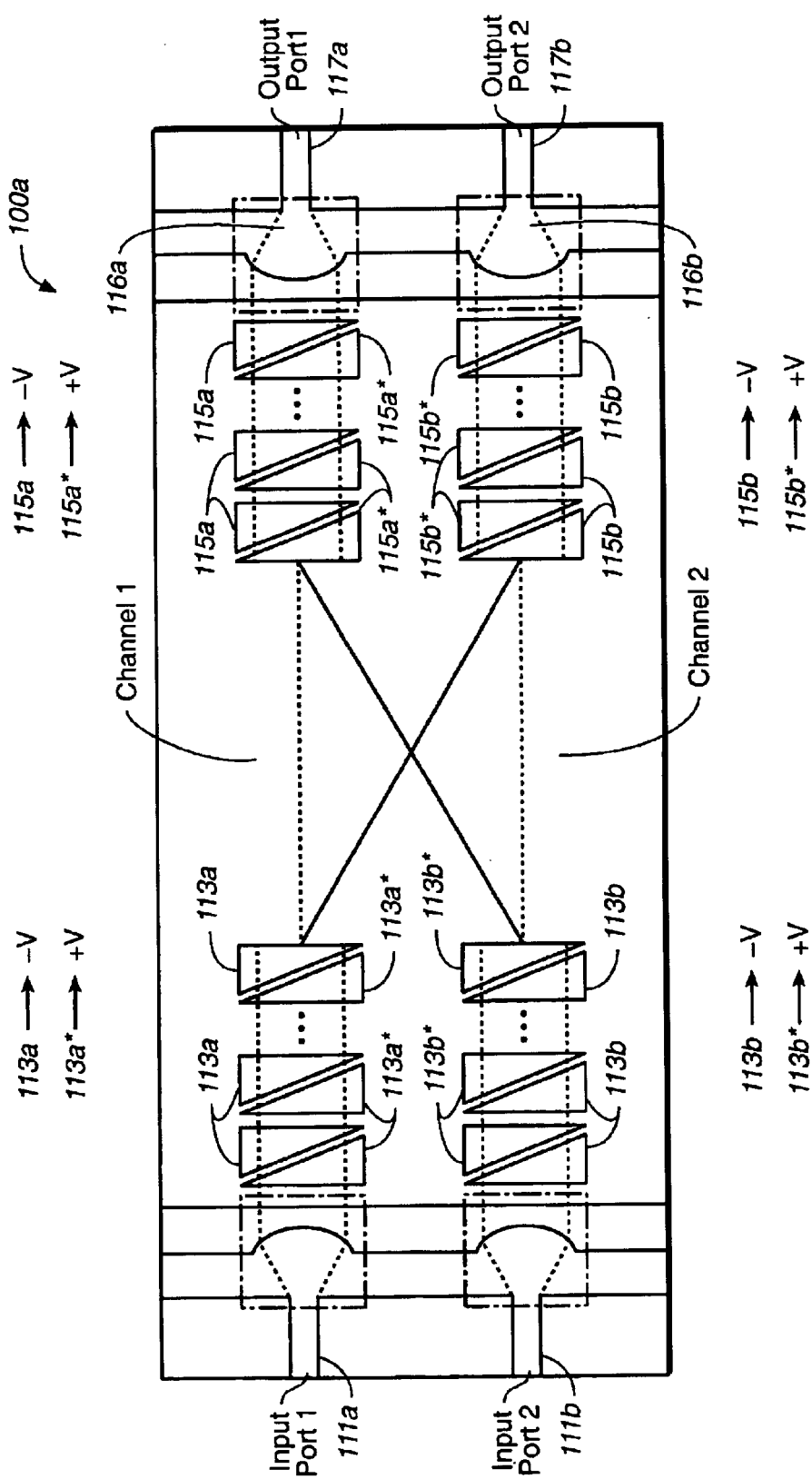
FIG._5

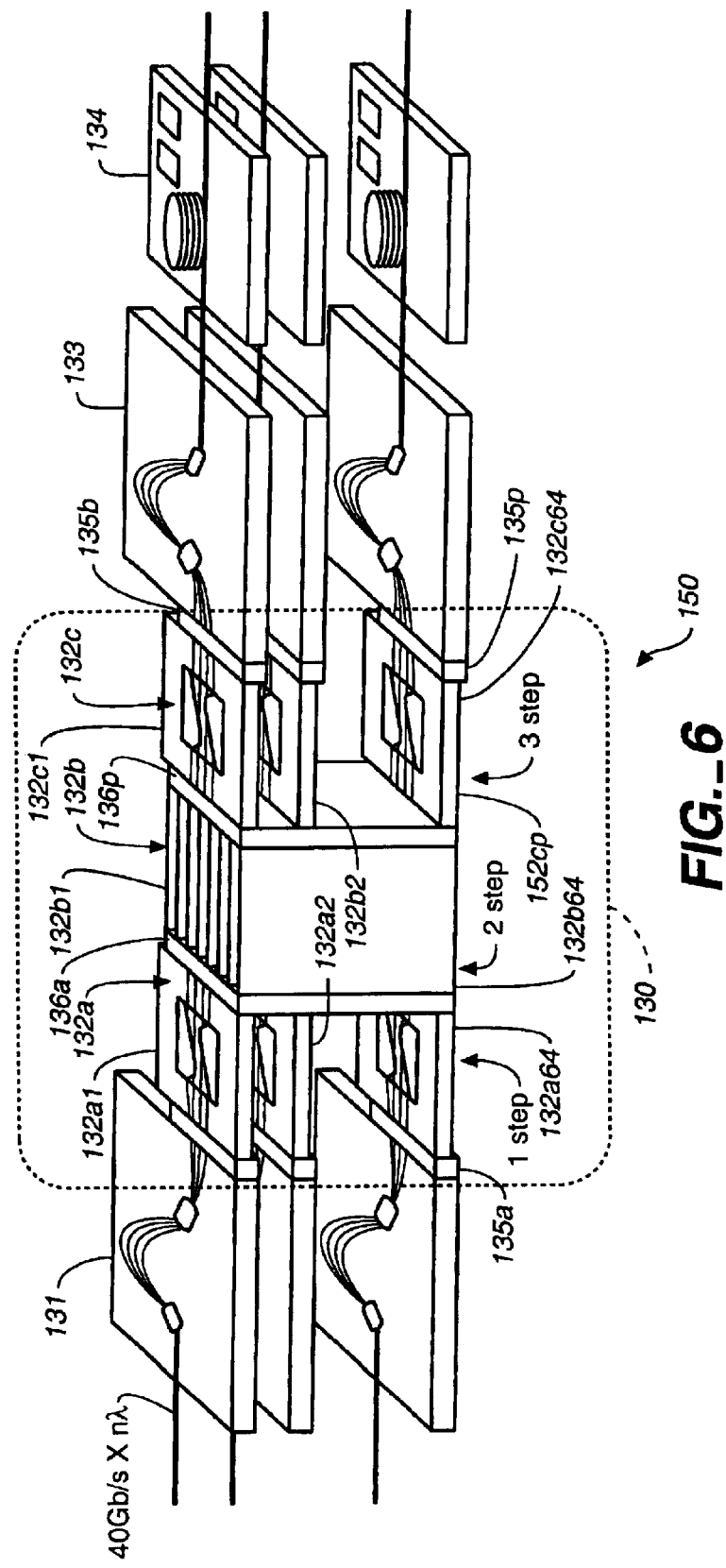
FIG._6

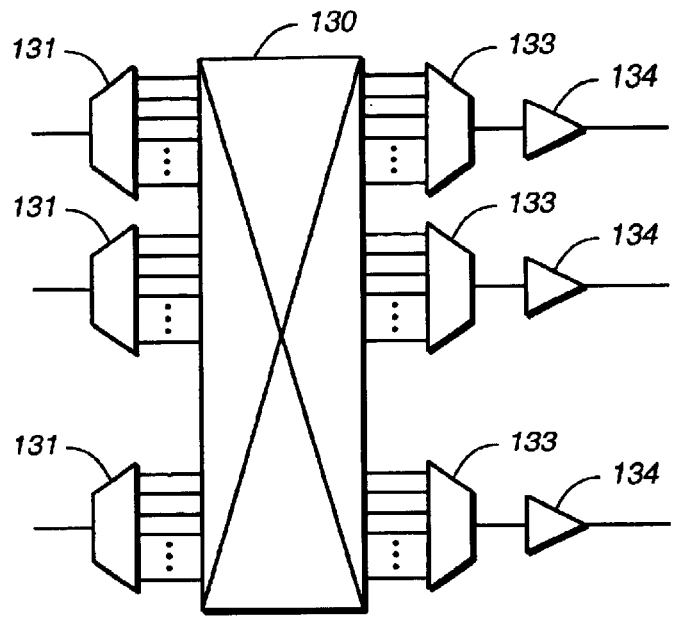
FIG._7
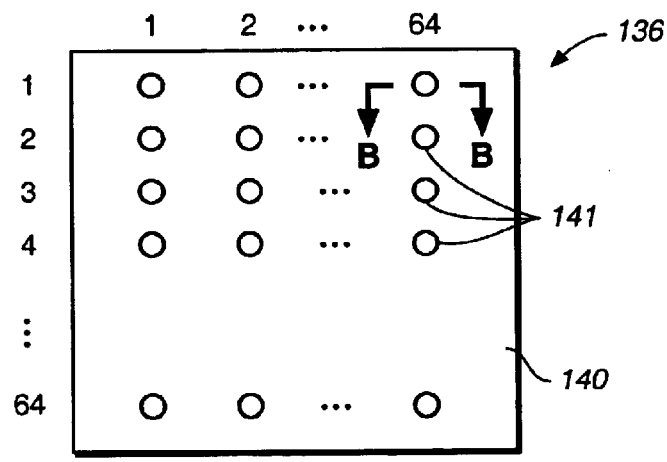
FIG._8A
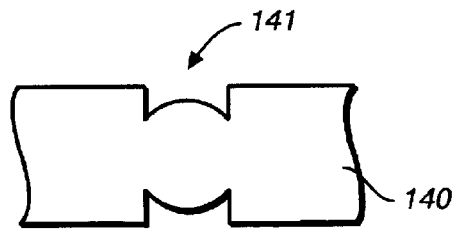
FIG._8B

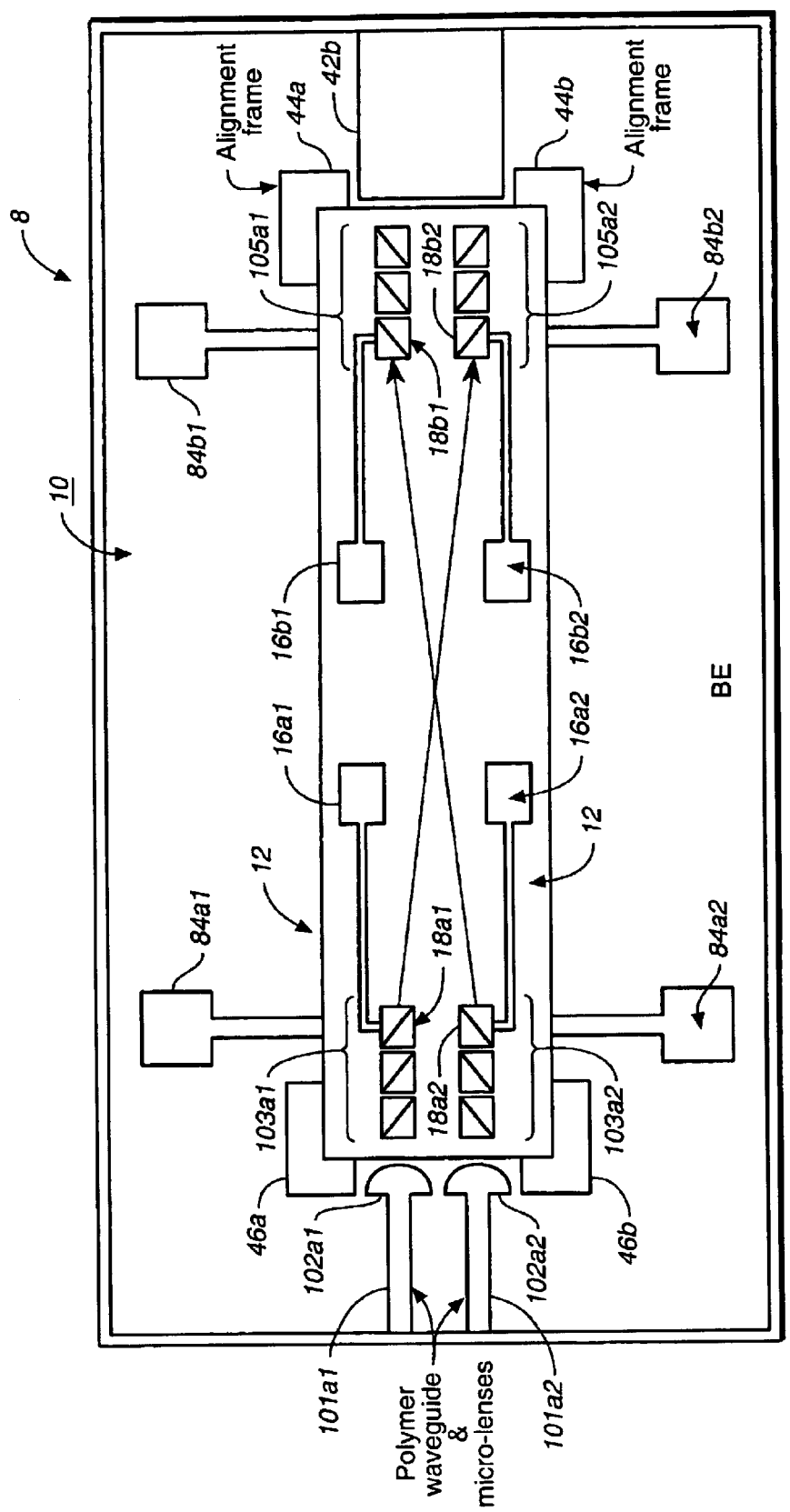
FIG._9A

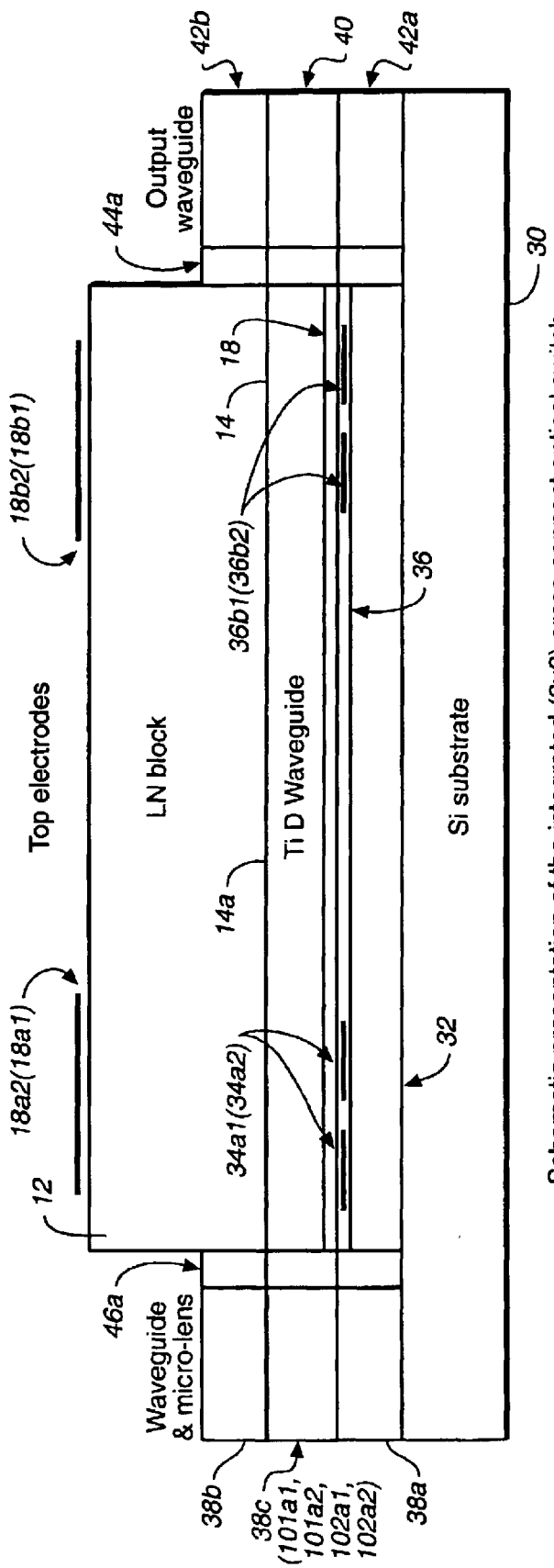
FIG._9B
Schematic presentation of the integrated (2x2) cross-connect optical switch

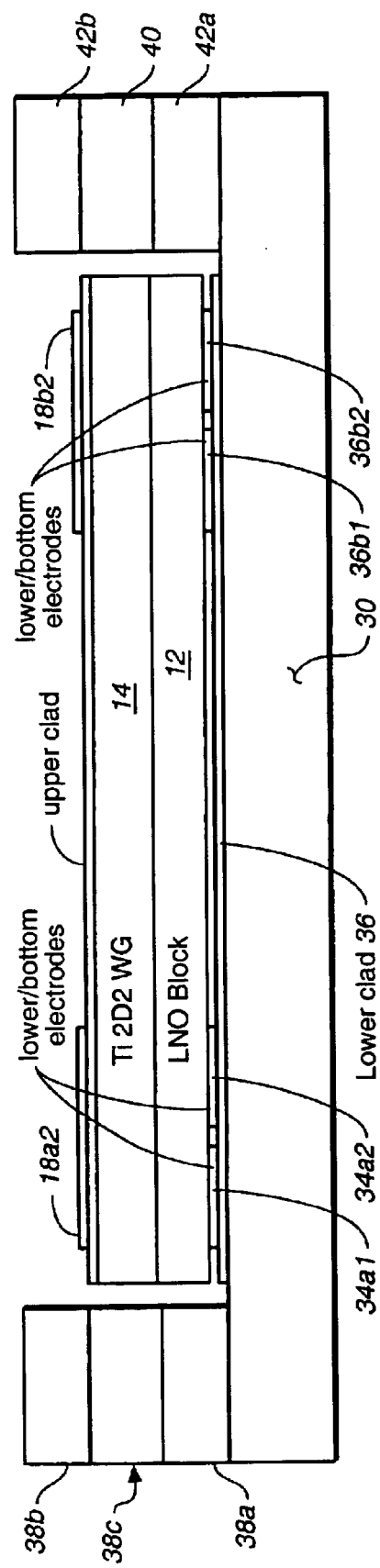
FIG._9C

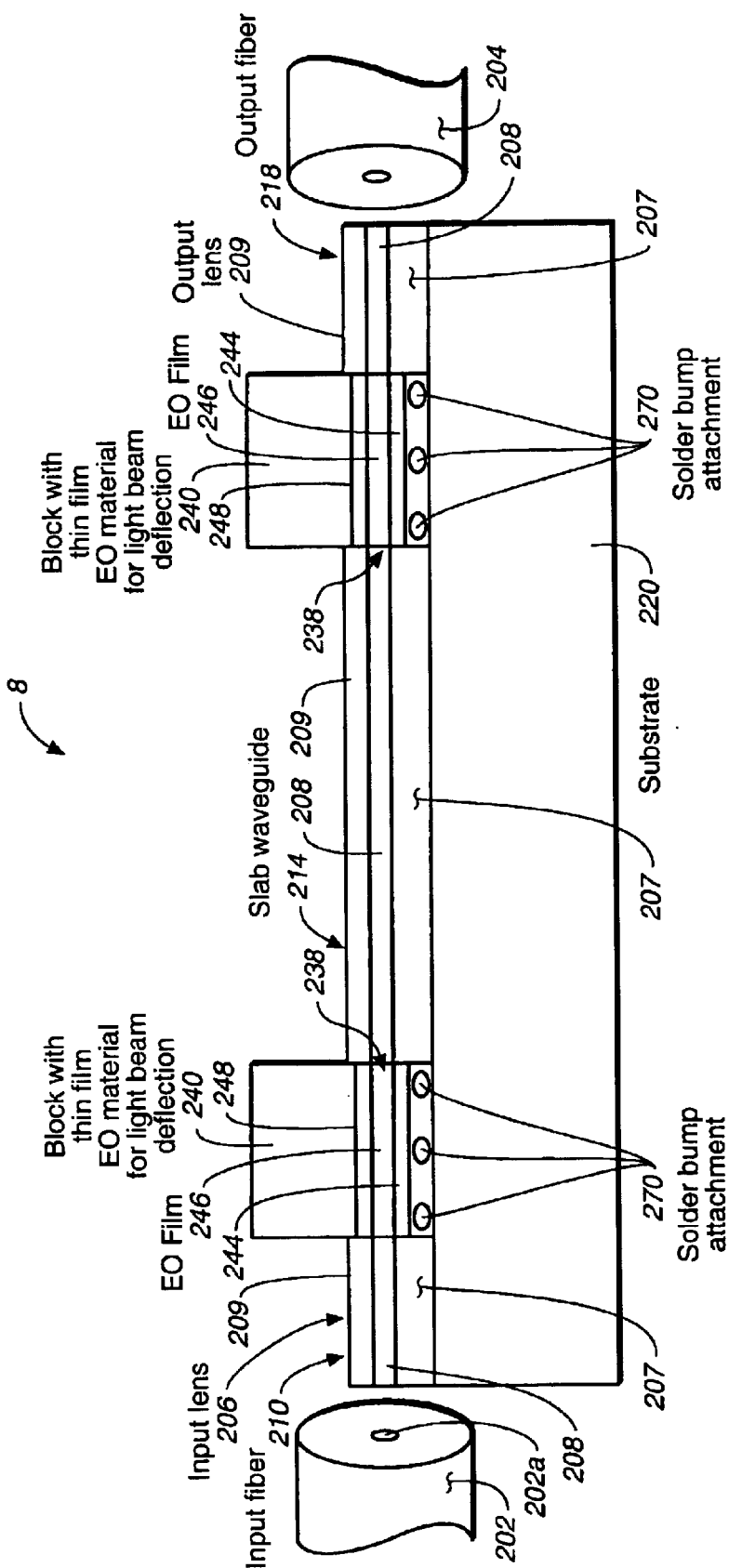
FIG._9D

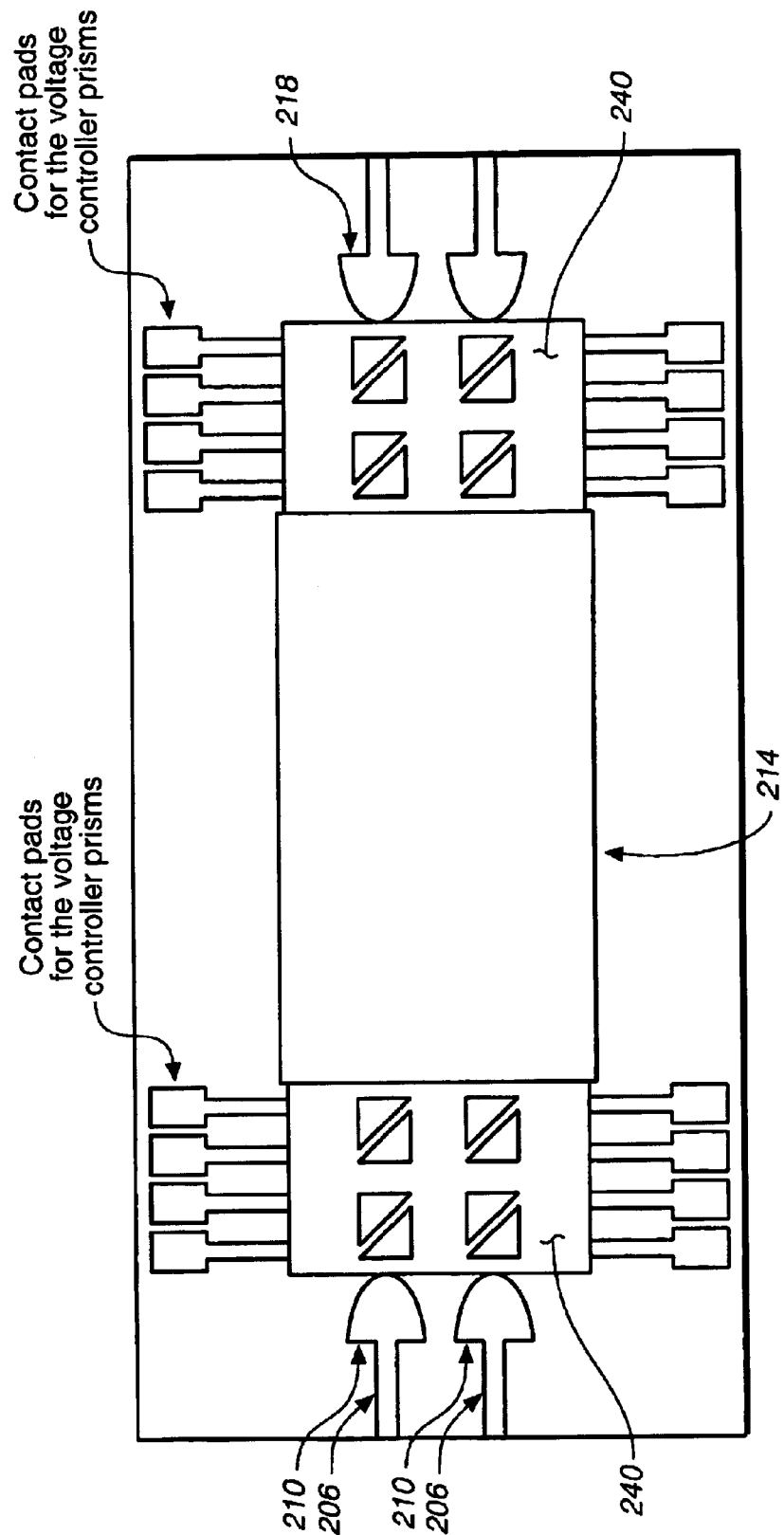
FIG._9E

Low clad polymer layer (PL1) deposition
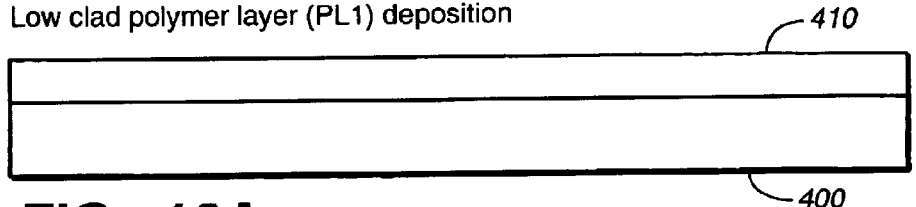
FIG._10A
Recess etch in PL1 layer
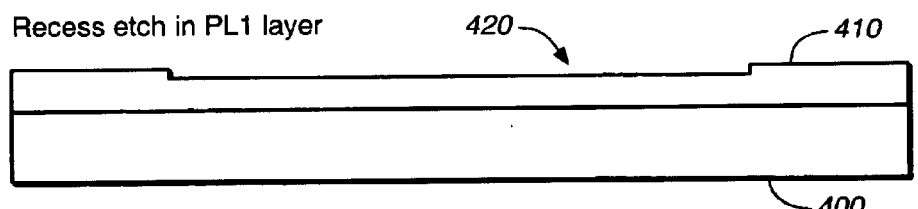
FIG._10B
Deposition and patterening of bottom electrodes & deposition of SiO$_2$ protection layer
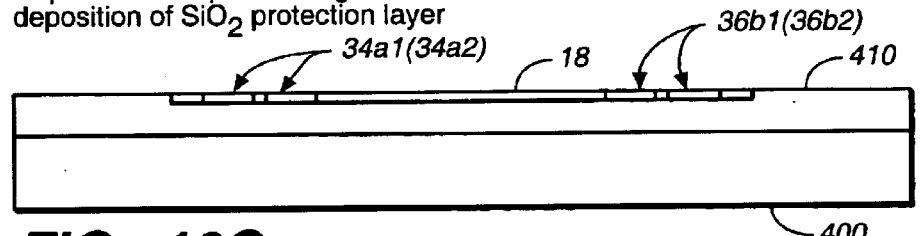
FIG._10C
Deposition of PL2 core layer
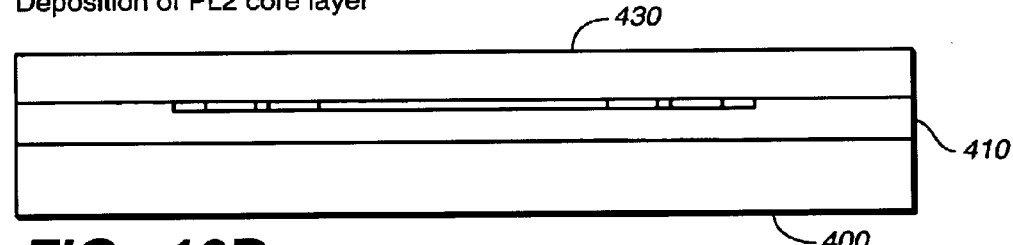
FIG._10D
Patterning of PL2 core layer for microlenses and alignment frame
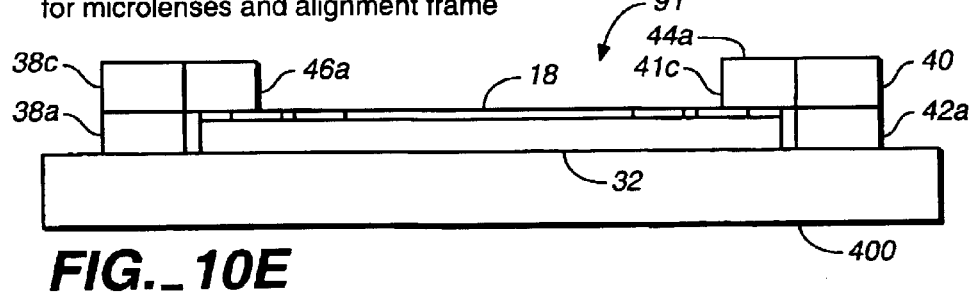
FIG._10E

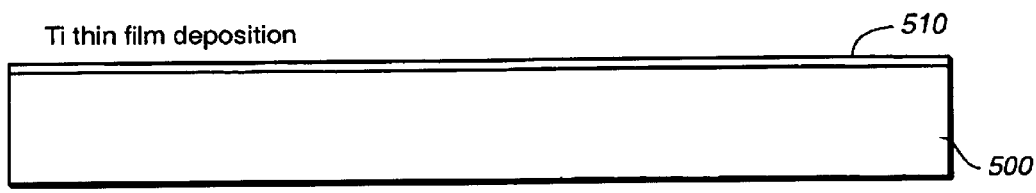
FIG._11A
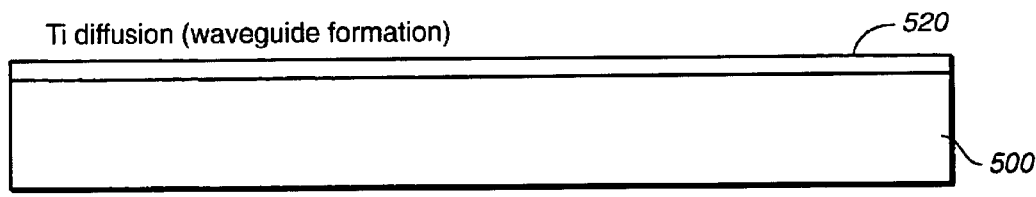
FIG._11B
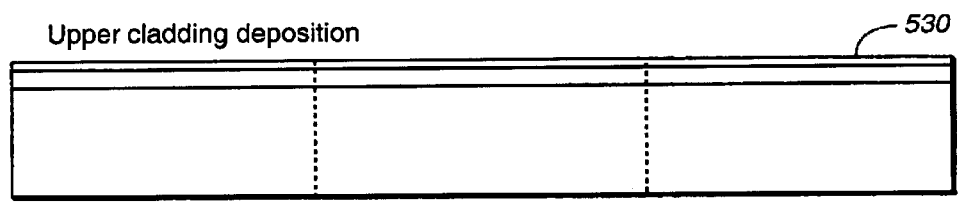
FIG._11C
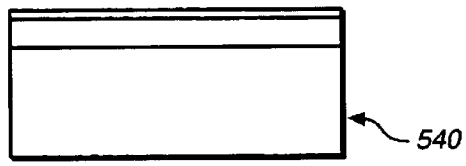
FIG._11D
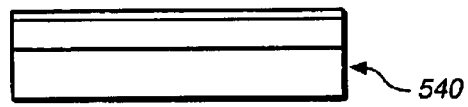
FIG._11E
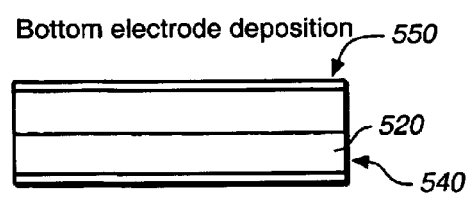
FIG._11F

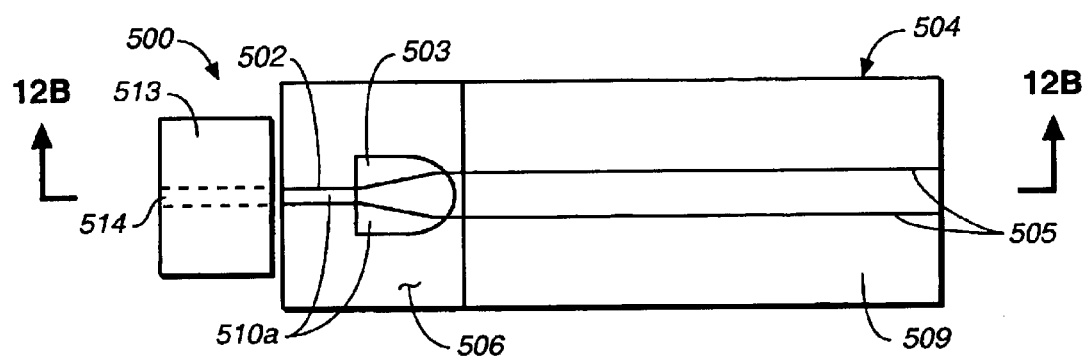
FIG._12A
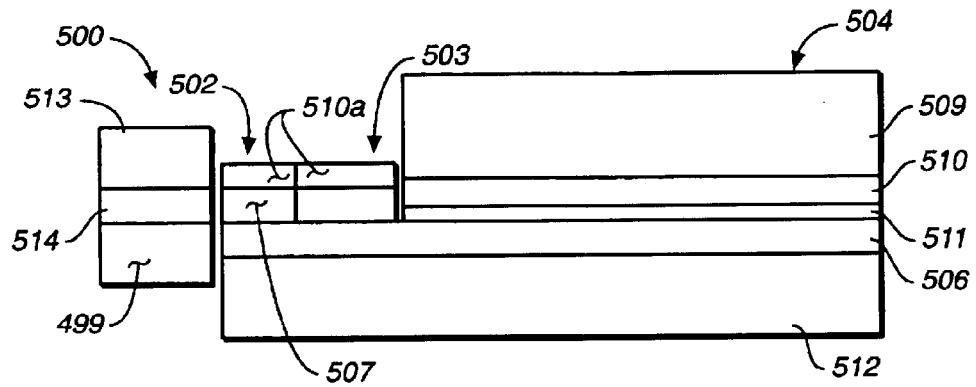
FIG._12B

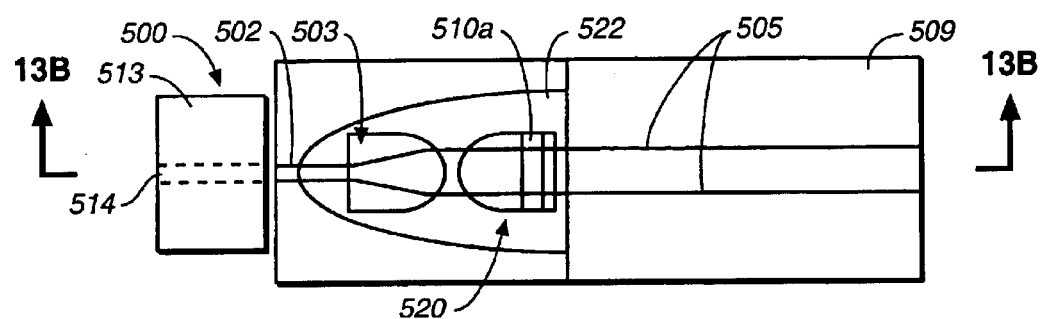
FIG._13A
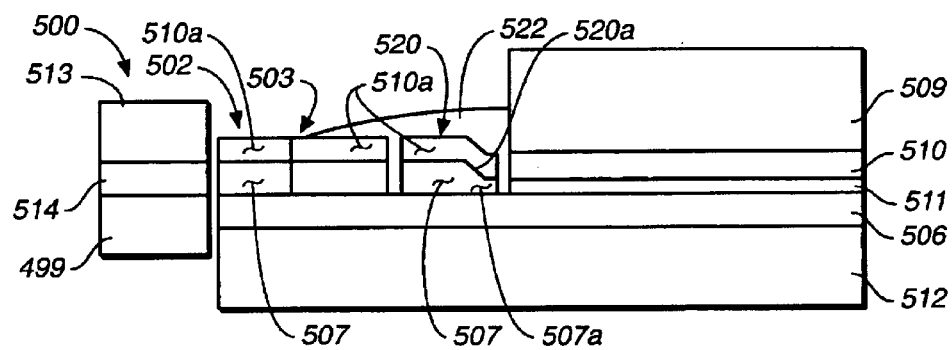
FIG._13B

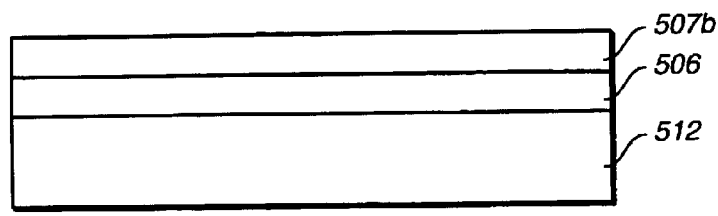
FIG._14A
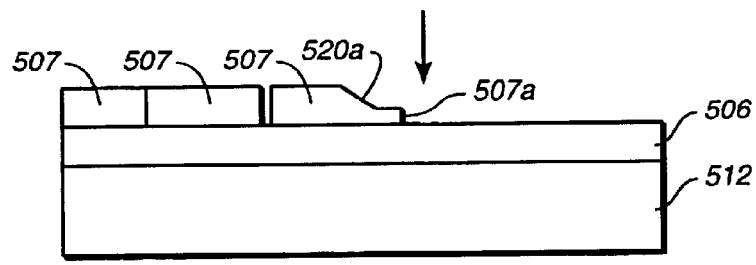
FIG._14B
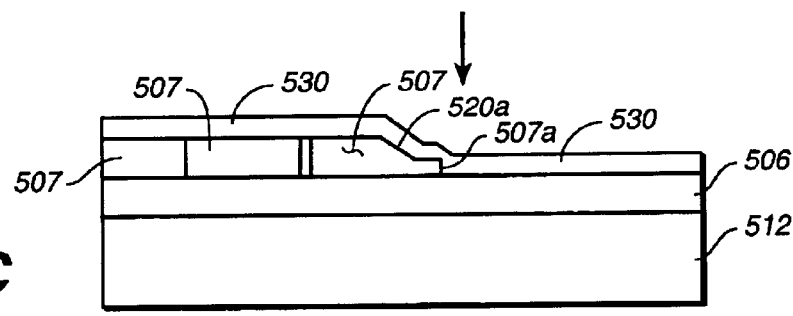
FIG._14C
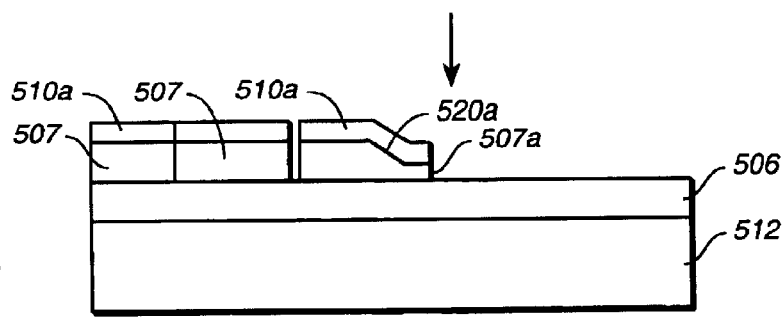
FIG._14D

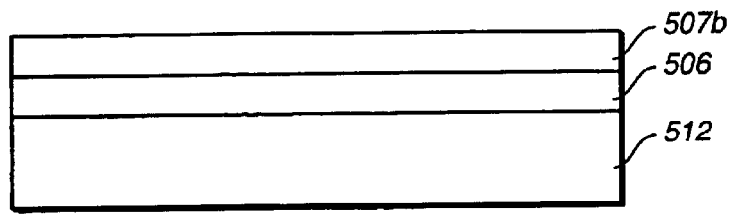
FIG._15A
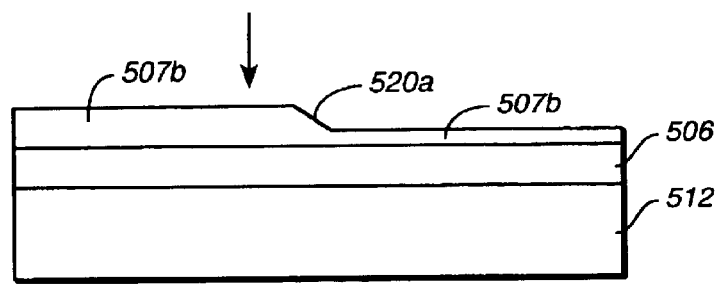
FIG._15B
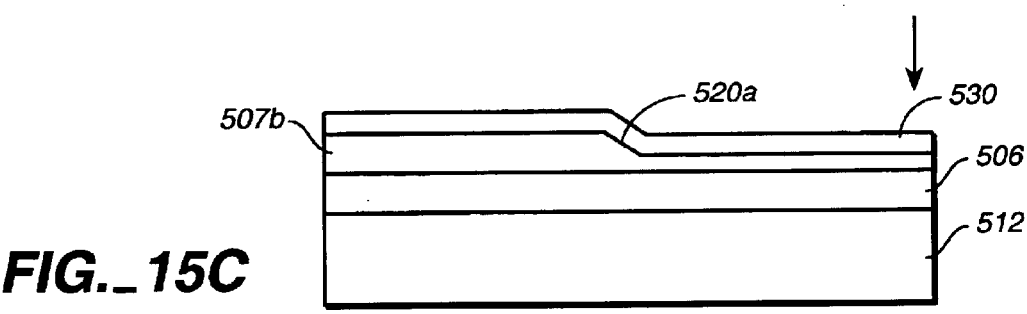
FIG._15C
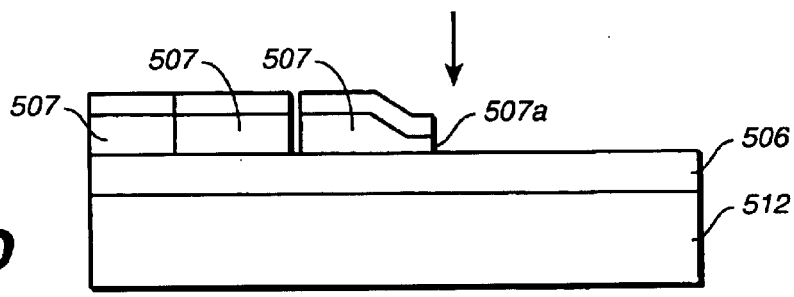
FIG._15D

OPTICAL SWITCHING APPARATUS WITH ADIABATIC COUPLING TO OPTICAL FIBER

This is a continuation-in-part application of copending application having application Ser. No. 09/932,526, filed Aug. 17, 2001. Benefit of the earlier filing date is claimed with respect to all common subject matter.

BACKGROUND OF THE INVENTION

1. Field of the Invention

This invention is related to an optical switching apparatus used in an optical network for voice and data communications. More particularly, embodiments of the present invention provide for an optical switching device with adiabatic coupling to an optical fiber and method for fabricating an optical switching device with an adiabatic coupling structure.

2. Description of the Related Art

Strong growth of optical networks for voice and data communication results in huge demand for high data rate information transfer capabilities. To enable such transfer capabilities, dense wavelength division multiplexing (DWDM) technology has been developed which allows transfer of multiple wavelength over the same fiber leading to data transfer rates up to 40–100 Gb/s. High speed switching and routing devices comprise the core elements of the optical networks and allow dynamic control of the data traveling over the optical network. Furthermore, high data transmission rates impose strong requirements on the functionality of the switching devices.

Optical cross-connect space division switches based on optic-electro (OE) deflection of the light beam have great potential for future implementation in high speed optical networks. One of the basic concerns is the switching time and a capability of handling a great number of input and output channels, e.g., up to 4000×4000 by the year 2003, as well as reliability and cost factors. Existing optical switching devices which employ signal conversion from optical into electrical and back into optical do not satisfy those requirements. Having very low switching times switching matrixes can be designed to connect very large number of input and output (I/O) ports. Such switches may be built from an assembly of simple digital optical switches where each can redirect one input signal into two possible output ports. However, optical cross-connect switching elements are more useful for large-scale implementations. These devices require large-scale monolithic switch arrays to perform switching functions. Although, the main principle of the optical cross connect switching based on the light beam deflection is well known, a robust, reliable, low cost and extendable integration process for such type of switching device is not available.

Currently, the main optical switching products on the market (e.g. Lucent's Lambda-router) are based on MEO-NIS technology, which employs rotating micro-mirrors to deflect light. However, these optical switching devices are not very reliable due to many moving parts, and also the switching time is limited by the mechanics of the mirrors. It is desirable to improve the reliability of the many moving parts of the optical switching devices and to overcome the limitation of the switching time in these devices due to the mechanics of the micro-mirrors.

There are several other optical switching technologies which are still not well represented in the market due to various technological and economic difficulties. Such optical switching technologies include by way of example only: the bubble switch from Agilent Technologies Inc., switches based on liquid crystals, and thermo-optic and electro-optic (EO) effects, etc. Most of these devices are still in the R&D stage. Some of those technologies including EO switches may be applicable for high speed, low cost, high reliability, and high I/O port count products.

Especially, thin film electro-optic (EO) devices provide a number of advantages compared to their bulk material counterparts. There are a number of requirements which have to be satisfied for a fabrication of a high quality EO device for optical signal transmission. First, a waveguide with a core layer and two cladding layers should be formed to allow a low-loss propagation of a light beam. Second, an active material should have a high EO coefficient for the correct functionality. Third, for a number of the device types the thickness of EO material should be in a very narrow range (5–10 $\mu$m) in order to reduce the applied voltage needed for the EO change of the material refractive index (RI) and at the same time to allow low-loss coupling between a light beam coming out of an optical fiber and an optical switching device.

Therefore, what is needed and what has been invented is an improved optical switching device and method for fabricating the improved optical switching device. What is further needed and what has been invented is a tapered structure in a coupling structure of an optical fiber and an optical switching device and a fabrication process of the tapered structure in a coupling structure of an optical fiber and an optical switching device.

SUMMARY OF THE INVENTION

Embodiments of the present invention broadly provide a coupling structure for optically coupling an optical device to an optical fiber. The optical device includes a core layer for guiding a light beam emanating from a core layer of an optical fiber. The dimension of the core layer of the optical fiber and of the optical device may be any suitable dimension. Where the thickness of the core layer of the optical device is thinner than the thickness of the core layer of the optical fiber, power loss of a light beam is caused at an interface between the optical fiber and the optical device interface. Embodiments of the present invention provide ways for avoiding a power loss for a light beam and for establishing an adiabatic coupling between an optical device and an optical fiber.

Embodiments of the present invention more specifically provide a coupling structure for optically coupling an optical fiber to an optical device. The coupling structure has a core assembly defined by a first core layer having a first thickness, a second core layer having a second thickness which is thinner or less than the first thickness of the first core layer, and a tapered core layer integrally bound to the first core layer and to the second core layer. The tapered core layer has a tapered surface extending downwardly from the first core layer to the second core layer. The optical device preferably includes a planar microlens located between the optical fiber and the second core layer.

A further aspect of the present invention includes an optical assembly comprising a waveguide having a core layer for receiving as input a light beam emanating from an optical fiber, and a lens having a lens core layer for collimating a light-beam input to the waveguide. The optical assembly includes another waveguide with a core layer in which collimated light beam propagates, an optical deflector which deflects the collimated light beam, and a coupling means for allowing the propagating light core layer to be PLZT or PZT of reduced thickness.

The present invention further provides a method for fabricating an optical switching device with an adiabatic coupling structure comprising disposing a first cladding layer on a substrate, disposing a core layer on the first cladding layer, forming a slanted surface in the core layer to produce a core layer with an adiabatic structure, and disposing a second cladding layer over the core layer.

These provisions together with the various ancillary provisions and features which will become apparent to those skilled in the art as the following description proceeds, are attained by the optical apparatus and method of the present invention, preferred embodiments thereof being shown with reference to the accompanying drawings, by way of example only, wherein:

BRIEF DESCRIPTION OF DRAWINGS

FIG. 1 illustrates a schematic diagram showing an optical switch module.

FIGS. 2 and 3 illustrate the detailed structure of parts of the optical switch module.

FIGS. 4A, 4B and 4C illustrate a schematic diagram for showing deflection of light of a prism pair.

FIG. 5 shows a 2 by 2 channel optical switch module.

FIG. 6 illustrates a diagram for a light signal switching apparatus using the optical switch module.

FIG. 7 illustrates a schematic diagram of the light signal switching apparatus shown in FIG. 6.

FIGS. 8A and 8B show a structure of a light connector.

FIGS. 9A and 9B illustrate top and side views of one embodiment of an integrated (2×2) cross-connect optical switch.

FIG. 9C is a side elevational view of another embodiment of the optical switch of FIGS. 9A and 9B.

FIGS. 9D and 9E illustrate side and top views respectively of another embodiment of a cross-connect optical switch.

FIGS. 10A–10E illustrate a process flow of a substrate on which the deflecting device is mounted.

FIGS. 11A–11F illustrate a process flow of fabrication of the deflecting device.

FIG. 12A shows a top plan view of a structure for coupling an optical fiber to an optical device.

FIG. 12B is a vertical sectional view taken in direction of the arrows and along the plane of line 12B—12B in FIG. 12A.

FIG. 13A shows a top plan view of a structure with a tapered lens for coupling an optical fiber to an optical device.

FIG. 13B is a vertical sectional view taken in direction of the arrows and along the plane of line 13B—13B in FIG. 13A.

FIGS. 14A–14D show a process flow for fabrication of a tapered structure.

FIGS. 15A–15D show an another process flow for fabrication of a tapered structure.

DETAILED DESCRIPTION OF PREFERRED EMBODIMENTS OF THE PRESENT INVENTION

Referring in detail now to the drawings in combination with the detailed description hereinafter presented, there is illustrated and described an integration process, which allows fabrication of a non-blocking optical cross connect switching matrix with a large (e.g., at least up to 4000) number of I/O channels. The functional principle of the device is based on the EO induced deflection of the incoming optical beam or optical signal that can reroute the incoming light signal from an input port to an output port. Physical principle of the EO induced light beam deflection in piezoelectric materials is well known and is described in an article entitled "Low-Voltage Drive Electro-Optic Pb (Zr, Ti) $O_3$ Waveguide Devices Fabricated By Solid-Phase Epitaxy" to Nashimoto et al of the Corporate Research Laboratories of Fuji Xerox Co., Ltd., Japan.

The detailed description provides a hybrid integration process including an OE deflecting element disposed on a silicon substrate, allowing fabrication of a (2×2) cross-connect switching device. The (2×2) cross-connect switching device is used for illustration only, and embodiments of the integration process can easily be extended to fabricate switching systems with much larger number of I/O ports, such as 4000×4000 input/output ports. The silicon substrate is employed to exemplify the process. Therefore, the silicon substrate may be replaced by any other substrate, e.g., glass plate, printed circuit board, etc., which may be chosen according to the design requirements. Two examples of switching elements are presented, one is made of thin film EO material, for example PZT or PLZT, and the other one is made from $LiNbO_3$ (lithium niobate, hereinafter termed as "LN") with a transitional metal (e.g., Ti) in-diffused waveguide and with top and bottom electrodes having a prism shape. It is to be understood that LN or PZT may be replaced by any material with a strong electro-optical coefficient. The material may be either a bulk or thin film material and the electrodes may be made in various shapes, such as prisms, gratings, various combinations and arrays of prisms and gratings, etc. Thus, LN means not only lithium niobate, but also other suitable electro-optic material to be formed as a wafer. Whole structures of an optical switching device and deflectors which implement the present invention are described in a Japanese patent application number Tokugan 2001040006, filed on Feb. 16, 2001 and a Japanese patent application number Tokugan 2001-56009, filed on Feb. 28, 2001. Waveguide circuits and/or optical signal routing and switching are described in the following U.S. Patents which are fully incorporated herein by reference thereto as if repeated verbatim immediately hereinafter: U.S. Pat. No. 6,141,465 to Bischel et al.; U.S. Pat. No. 5,572,540 to Cheng.; U.S. Pat. No. 5,103,494 to Mozer; U.S. Pat. No. 5,894,538 to Presby; U.S. Pat. No. 5,854,868 to Yoshimura et al.; U.S. Pat. No. 5,465,860 to Fujimoto et al.; U.S. Pat. No. 5,835,646 to Yoshimura et al.; U.S. Pat. No. 5,540,346 to Fujimoto et al.; U.S. Pat. No. 5,220,582 to Kaharu et al.; U.S. Pat. No. 5,218,654 to Sauter; U.S. Pat. No. 5,093,890 to Bregman et al.; U.S. Pat. No. 5,822,475 to Hirota et al.; U.S. Pat. No. 5,204,866 to Block et al.; U.S. Pat. No. 5,010,505 to Falk et al.; U.S. Pat. No. 4,850,044 to Block et al.; U.S. Pat. No. 5,375,184 to Sullivan; U.S. Pat. No. 5,757,989 to Yoshimura et al.; U.S. Pat. No. 5,757,989 to Yoshimura et al.; U.S. Pat. No. 5,541,039 to McFarland et al.; U.S. Pat. No. 5,054,872 to Fan et al.; U.S. Pat. No. 5,978,524 to Bischel et al.; U.S. Pat. No. 5,732,177 to Deacon et al.; U.S. Pat. No. 5,488,735 to Tanabe et al.; and U.S. Pat. No. 5,408,568 to Hamilton et al.

Referring now to FIG. 1 there is seen a schematic diagram showing an optical switch module, generally illustrated as 100. The optical switch module 100 is constructed by an input side optical waveguide portion 101, an input side collimating portion 102, an input side deflecting portion 103, a common optical waveguide portion 104, an output side deflecting portion 105, a focusing portion 106, and an outside optical waveguide portion 107. The input side optical waveguide portion 101, the input side collimating portion 102, thus input side deflecting portion 103, the common optical waveguide portion 104, the output side deflecting portion 105, the focusing portion 106, and the outside optical waveguide portion 107 are all integrally formed on a substrate 98. The input side optical waveguide 101 is constructed of a plurality of optical waveguides, so called cores, 101a—101a, and clad layers 101b which cover and are selectively disposed between the plurality of optical waveguides 101a—101a, and keeps an optical beam lightwave within optical signal or respective optical waveguides 101a—101a by using the difference of refractive index between the waveguide 101a and the clad layer 101b. The output side of waveguide 107 is similar to the structure of the input side of waveguide 101 and is constructed of a plurality of optical waveguides, so called cores, 107a—107a, and clad layers 107b which cover and are selectively disposed between the plurality of optical waveguides 107a—107a, and keeps an optical beam, or optical signal, or light wave within respective optical waveguides 107a—107a by using the difference of refractive index between respective waveguides 107a and respective clad layers 107b.

As shown in FIG. 1, the number of the optical waveguides 101a of the input side of optical waveguide 101 is equal to the number of the optical waveguides 107a of the output side of optical waveguide 107. Herein after, the number of the optical waveguides 101a and the number of the optical waveguides 107a are referred as "n". Here, "n" is an integer having a value of two or more. In another embodiment of the invention, and by way of example only, it is to be understood that the number of the optical waveguides 101a of the input side of optical waveguide 101 may be different from the number of the optical waveguide 107a of the output side of optical waveguide 107.

The collimating portion 102 is comprised of "n" number of microlenses or collimating lenses 102a. Each of the collimating lenses 102a is located at a position slightly apart from the end portion of respective optical waveguides 101a. The light output from optical waveguides 110a is initially broadened out or scattered out in a radical manner, but then it becomes a collimating, confined, or registered light in the collimating lens 102a.

In the input side deflection portion 103, "n" number of light deflection elements 103a is provided. Each of the light deflection elements 103a is positioned at a location slightly apart in a light axis direction from respective collimating lens 102a. The light deflection element 103a deflects or changes the propagation direction of light signal by using Pockels cell effect, namely an electro-optic effect.

The common optical waveguide 104 is constructed by a slab type waveguide. The common optical waveguide 104 transmits a light that passed through the input side light deflection portion 103 to the output side light deflection portion 105. Within the common waveguide 104, plural optical signals pass through at the same time. Since these optical signals straightforwardly move in a predetermined direction within the common waveguide 104, the plural optical signals are transmitted without interfering or distorting each other. In other words, there is no criss-crossing of optical signals.

At the output side light deflection element portion 105, "n" number of light deflection elements 105a—105a are provided. These light deflection elements 105a—105a deflect, change, or alter an optical beam, optical signal, or a light wave that the light deflection elements 105a receive after passing through the common optical wave guide 104. Light deflection elements 105a, respectively, change direction of respective optical beams to a direction parallel to the optical axis direction of corresponding respective optical waveguides 107a. In a preferred embodiment of the direction, both light deflection elements 103a and 105a have generally the same structure.

The focusing portion 106 is comprised of "n" number of focusing lenses 106a—106a. These focusing lenses 106a—106a function to guide a light signal that passes through the respective light deflection element 105a to the optical waveguide 107a by focusing the light signal.

The waveguides or cores may be manufactured of any suitable material. For example, the waveguides may be formed using a highly transparent, highly heat-resistant polymer such as a fluorinated polyimide, or quartz or another glass or polymer material. The same type of material may also be used for the cladding layers, or an organic and/or inorganic hybrid may be used. The film forming method for these polymer systems may be spin coating, dip coating, spray coating, or a vapor phase growth process such as evaporation polymerization or CVD. For glass systems, sputtering, evaporation, CVD, plating or the like may be employed, and when a sol-gel method is used, spin coating, dip coating or spray coating may be employed.

Referring now to FIGS. 2 and 3, there is seen the detailed structure of parts of the optical switch module 100. The details of the collimating lens portion 102, the input side light deflection element portion 103, the output side light deflection element portion 105, and the focusing portion 106 in the optical switch module are explained with reference to FIGS. 2 and 3.

The collimating lenses 102a—102a, which are constructed of the same material as the collimating portion 102, as shown in FIGS. 2 and 3, are preferably a two-dimensional lens comprised of two portions 102c and 102d, each portion having a different refractive rate or index from each the other. The portion 102c, having a high refractive rate (a convex lens portion), is preferably formed by the same material used for forming the optical waveguides 101a and 107a, so-called core. The portions 106d and 102d, having a low refractive rate, are preferably an opening, air, or any suitable index matching material (e.g., gels) having a refractive index lower than the refractive index of the core (e.g., portions 102c and 106c).

The focusing lenses 106a—106a of the focusing portion 106 are similar to the collimating lens 102a. Each focusing lenses 106a includes a portion (a convex lens portion) 106c having a high refractive rate and the portion 106d having a low refractive rate. Preferably, the refractive direction of focusing lenses 106a—106a is opposite to the refractive direction of collimating lenses 102a—102a.

The light deflection elements 103a—103a, constructed as part of the input side light deflection portion 103, comprise one or more prism pairs 103p—103p. One prism pair 103p, as shown in FIG. 3, includes a slab type waveguide 103b made from a material having electro-optic effects. As further best shown in FIG. 3, the first and second upper electrodes 103c and 103d are formed on the upper side of slab type waveguide 103b, and first and second lower electrodes 103e and 103f are formed on the lower side of slab type waveguide 103b. The first and second upper electrodes 103c and 103d and these first and second lower electrodes 103e and 103f are formed in a shape of a triangle (a wedge shape), respectively.

The first upper electrode 103c and the first lower electrode 103e are opposed and face each other while holding the slab type waveguide 103b therebetween. The first upper electrode 103c and the second upper electrode 103d are spaced and face each other along an oblique side associated with each of the upper electrodes 103c and 103d. The second upper electrode 103d and the second lower electrode 103e are also opposed and face each other while holding the slab type waveguide 103b therebetween. Thus, the slab type waveguide 103b is common for each prism pair 103p. By using such a structure for each prism pair 103p, the size of each prism pair may be smaller.

Continuing to refer to FIG. 2, the light deflection elements 105a—105a of the output side light deflection portion 105 are similar to the input side light deflection elements 103a—103a, and include the slab type waveguide 105b made from a material having the characteristic of electro-optic effects, and one or more prism pairs 105p—105p. Each of the prism pairs 105p is identical to each of the prism pairs 103p, and more specifically includes a pair of first electrodes (not shown), but which correspond to and are essentially identical to the first upper electrode 103c and the first lower electrode 103e respectively, and a pair of second electrodes (not shown), but which correspond to and are essentially identical to the second upper electrode 103d and the second lower electrode 103f, respectively. Since they are identical to the electrodes for prism pair 103p, the first and second upper electrodes and the first and second lower electrodes for the prism pair 105p are formed into a shape of a triangle (a wedge shape), respectively.

Referring now to FIGS. 4A and 4B a schematic diagram is seen for illustrating deflection of light of prism pair 103p (i.e., electrodes 103c and 103e and electrodes 103d and 103f). In FIG. 4, arrow A indicates a direction of an axis of crystallization of the slab type waveguide 103b and arrow E indicates a direction of electronic field applied to the prism pair 103p.

Referring now to FIGS. 4A, 4B and 4C, the first lower electrode 103e is connected to the ground line (G) (see FIG. 4A). In this state, when a control voltage (+V) is applied to the first upper electrode 103c, the refractive index of the slab type waveguide 103b between the first upper electrode 103c and the first lower electrode 103e changes from n to n+Δn. Thus, the transmission direction A of light signal is deflected to right-hand side direction in view of the moving direction of the light signal at an angle θ. On the other hand, in a state that the second upper electrode 103d is connected to the ground line (G) as shown in FIG. 4B, where a control voltage (+V) is applied to the second lower electrode 103f, the refractive index of the slab type waveguide 103b located between the upper electrode 103d and the lower electrode 103f changes from n to n−Δn. Thus, the transmission direction A of light signal is further deflected to the right-hand side direction in view of the transmitted direction of the light signal at an angle θ. Hereinafter, these electrodes to which the control voltage is applied may also be called control electrodes, which correspond to the first upper electrode 103c and the second lower electrode 103f.

Therefore, a light signal can be deflected at an angle 2θ with one prism pair. Obviously, where "m" number of prism pairs 103p are located in tandem in each of the channels with "m" being an integer having a value of two or more, the deflection direction from the transmission direction of the light signal can be 2θ×m. The electrodes pinching the slab type waveguide made by a material with the characteristic of electro-optic effect between the electrodes may be formed to directly contact with the core layer of the slab waveguide or lower and upper cladding layers can be placed between the electrodes in a vertical stack: lower electrode, lower cladding layer, core layer, upper cladding layer, and upper electrode. In the latter case, the cladding layers inserted between the electrodes would result in significant reduction of optical losses induced by electrode metal absorption.

Referring now to FIG. 5, there is seen a 2×2 channel optical switch module 100a. The optical switch module 100a transmits the first light signal input into the first input port 1 to either output port 1 or to the output port 2. The second light signal input into the first input port 2 is transmitted to the remaining output port not receiving the first light signal, which is output port 1 or output port 2. Thus, if output port 2 receives the first light signal from input port 1, output port 1 would receive the second light signal from input port 2. When there is no criss-crossing of optical signals, such as where a light signal input into the first input port 1 is transmitted to the output port 1, and a light signal input into the second input port 2 is transmitted to the output port 2, a control voltage is not applied to any of the light deflection elements 113a, 113b, 115a, and 115b, and thus, no light signals are deflected at the light deflection elements 113a, 113b, 115a, and 115b. Accordingly, the light signal input into channel waveguide 111a would be transmitted to light waveguide 117a, and the light signal input into channel waveguide 111b would be transmitted to light waveguide 117b, all without any optical criss-crossing due to any applied control voltage.

Where a light signal input into the first input port 1 is to be transmitted to the output port 2 and a light signal input into the second input port 2 is to be transmitted to the output port 1, a +V control voltage would be respectively applied to the control electrodes of respective light deflection elements 113a*, 113b*, 115a*, 115b* and a minus control voltage −V would be applied to the control electrodes of the light deflection elements 113a, 115a, 113b, and 115b (see FIG. 5). Accordingly, the light signal input into the input port 1 would be deflected toward the right hand direction in view of the transmission direction of the light signal at the light deflection element 113a, and then, upon reaching light deflection element 115b, the deflected light signal would be deflected again into a direction parallel to the longitudinal axis of optical waveguide 117b at light deflection element 115b, and would be focused by focusing lens 116b into the optical waveguide 117b, and then transmitted into the output port 2. Similarly, the light signal input into the input port 2 would be deflected in a left hand direction in view of the transmission direction of the light signal at the light deflection element 113b and into light deflection element 115a, and then, upon reaching light deflection element 115a, the deflected light signal would be deflected again into a direction parallel to the longitudinal axis of optical waveguide 117a at the light defection element 115a, and would then be transmitted to the output port 1 through the focusing lens 116a and the optical waveguide 117a.

Referring now to FIG. 6, a diagram is seen for a light signal switching apparatus 150 using the optical switch module 100 as described previously. FIG. 7 shows a schematic diagram of the light signal switching apparatus shown in FIG. 6. The light signal switching apparatus 150 has 64 inputs of WDM signal in which light signals for 64 wavelengths with 40 Gb/s are multiplexed. The transmittal direction of these multiplexed light signals are switched or changed in the light signal switching apparatus 150.

The light signal switching apparatus 150 comprises sixty four AWG light dividers 131 arranged along in a vertical direction in FIG. 6, a three step-structure light switch module 130, sixty four light composers 133, and sixty four light amplifiers (EDFA: Erbium Doped Fiber Amplifier)

134. In each step of the three step-structure light switch module 130, there are a plurality of light switch modules, such as optical switch module 100. More specifically, each step of the three step-structure light switch module 130 includes the plural light switch modules 132a, 132b, and 132c. Each of the plural light switch modules 132a, 132b, and 132c is constructed from sixty-four light switch modules, each having 64×64 channels. More specifically further, each of the sixty-four light switch modules includes sixty-four light input ports and sixty-four light output ports. Each of the sixty-four light switch modules are different from the FIG. 5 light switch module 100a which has two by two channels because of the number of the input ports and the number of the output ports. In the first step, the sixty-four switch modules 132a1–132a64 are arranged in a direction with the substrate of the light switch module 132a. As similar to the first step, in each second step and each third step, the sixty-four switch modules are arranged in an appropriate registry direction with the substrate of the respective light switch modules 132b and 132c. In the second step of the three step-structure light switch module 130, the sixty-four light switch modules 132b1–132b64 are located in a state or position where they are rotatably disposed at 90 degrees against and with respect to the sixty-four light switch modules 132a in the first step and the sixty-four light switch modules 132c in the third step. The sixty-four light switch module 132c in the third step is located around an axis extending along one of the channels of the light switch module 100a.

Each of the light dividers 131 and each of the light switch modules 132a in the first step are coupled by a light connector 135a. Likewise, each of the light switch modules 132a in the first step and each of light switch modules 132b in the second step are coupled by a light connector 136a. Similarly, each of the light switch modules 132b and each of the light switch module 132c are coupled by a light connector 136b, and each of the light switch modules 132c and each of the light composers 133 are coupled by a light connector 135b.

FIGS. 8A and 8B show a structure of the light connector 136. FIG. 8A shows a top plan view of the light connector 136, and FIG. 8A shows a vertical sectional view taken along the plane of the B—B line in FIG. 8A. As shown in FIGS. 8A and 8B, the light connector 136 comprises a substrate 140 having various number of tiny lenses 141 through which a light signal passes in the direction of the thickness (i.e., a vertical direction) of the substrate 140. With the light connector 136, the lenses 141 are arranged along two-dimensional directions. But with the light connector 135, lenses 141 are arranged along only a single dimensional direction. The arrangement pitch of the lenses 141 is set to the same as the interval pitch of the input ports and/or output ports of the light switching modules 132a, 132b, and 132c. The lenses 141 of these light connectors 135 and 136 focus a light output from a preceding optical device and transmit same to an immediate subsequent optical device thereof; thus, they are useful to lower the loss of transmission. In this embodiment of the optical switching device, there is a microprocessor controller for turning on and/off the voltage applied to each of the control electrodes of the light deflection elements in each of light switching modules 132a, 132b, and 132c. The microprocessor (not shown in the drawings) is coupled to each of the electrodes of the light deflection elements through a conductive wire which transmits an electronic signal from and controlled by the microprocessor.

Referring now to FIGS. 9D and 9E for an embodiment of a switching device 8 on the side view of the panel in FIG. 9D input and output fibers 202 and 204 are depicted. The input signal from input fiber 202 is carried into the core layer 208 of the channel waveguide 206 of the input micro-lens (ML) 210. The core 202a of the fiber 202 is aligned to the core 208 of the ML 210. The core layers 208 of the input ML 210, slab waveguide 214 and output ML 218 are vertically aligned. The lower cladding 207, core 208 and upper cladding layers 209 of the input ML 210, slab waveguide 214, and output ML 218 can be fabricated from the same material and therefore can be formed with the same process. The films are sequentially deposited on substrate 220, first the lower cladding layer 207, then the core layer 208, and then the upper cladding layer 209. After that the films are patterned by means of either photoresist patterning and etching, or by direct photo-patterning in case the film material is photosensitive. A wide variety of materials can be used for the ML 218 and slab waveguide 214 layers. Silica layers are preferred due to very low loss and high stability. However, different polymer material such as photoepoxies or polyimide can be used and may have some advantages which include but are not limited to low stress and low bow of the substrate and low processing temperatures. Photosensitive polymers can be used for direct patterning. Since the core layers 208 of the MLs 210 and 218 and slab waveguide 214 are fabricated in the same deposition step, they are vertically leveled. In the case of separate ML and slab-waveguide deposition the thicknesses of the lower cladding layers 207 should be adjusted so that the core layers 208 are leveled.

Electro-optic (EO) film 238, such as PZT, PLZT, etc., is deposited on a substrate or block 240. For example $SrTiO_3$ can be used as a substrate material. The EO film 238 has three layers, lower cladding 244, core 246, and upper cladding 248. Films 238 can be deposited by any deposition technique known to those skilled in the art. The example sol-gel deposition or pulsed laser deposition, or MOCVD. The choice of the deposition technique is determined by several factors including the quality of the final films, effective film area, film thickness etc. Usually the thickness is limited by the epitaxial nature of the films and cannot exceed a certain value. For example, low loss PLZT or PZT films currently available are limited to 3–5 µm thickness. Since the lower and upper cladding layers 244 and 248 are part of this thickness, the core 246 of the EO film 238 layer can be limited to 1–3 µm. After deposition of the EO films 238, the substrate 220 is diced to dimensions required and the side-walls of the block 240 are polished to the optical grade. The dimension control of the block 240 during polishing is of keen importance since the block 240 should be assembled between the ML's and the slab waveguide 214 with very high precision.

The block 240 with the EO film 238 is assembled up side down on the substrate 220 with ML's and slab waveguide as shown in the side view in FIG. 9D. The top surface of the EO film 238 is patterned with metal electrodes having a prism shape as was shown in previous figures. The wiring with wiring contact pads can be formed on the substrate 220. The EO film block 240 is attached to the substrate 220 and the prism electrodes on the surface of the EO film are contacted to the wiring lines which are formed on the substrate. Electrical contact from the prisms to the wiring lines as well as attachment can be realized by flip-chip bonding using solder bumps. This technique is well established in semiconductor and optical industry. Solder bumps (circles 270 between the substrate 220 and the EO block 240) are schematically shown in FIG. 9D. Besides solder bumps 270, the EO block 240 can be attached to the substrate 220 by any other method appropriate in this device structure.

FIGS. 9A and 9B show top and side views of the schematic structure of another embodiment of an integrated (2×2) switching device 8. The switching part of the device 10 includes a LN block 12. The LN block 12 is prepared from a single crystal LN wafer in a manner described below. A two-dimensional transitional metal-diffused (e.g., Ti-diffused) waveguide (WG) 14 is formed in the LN block 12 for vertical confinement of the transmitting light modes. The thickness of the LN block 12 may be varied from 10 to 500 μm. In FIGS. 9A and 9B, the LN block 12 is placed with Ti-diffused waveguide 14 facing a silicon substrate 30, in order to align a polymer waveguide cores 38C and 40 with a LN slab waveguide core 14, which is the two-dimensional Ti-diffused waveguide. The waveguide 14 functions as the previously described common waveguide.

In the case of very thin LN films, a structural embodiment shown in FIG. 9C is possible in which the bottom layer (i.e., a low clad polymer layer 32) is etched all the way down to the substrate 30, and the LN block 12 is placed in the recess such that the waveguide region 14 (the two-dimensional Ti-diffused waveguide 14) is generally aligned with waveguide core layers (identified as "38c" and "40" below) and the bottom surface of the two-dimensional Ti-diffused waveguide 14 is located equal to or slightly higher or lower than the top surface of the low clad polymer layer 38a and 42a. In this structural embodiment, the thickness of LN block 12, not including the thickness of the two-dimensional Ti-diffused waveguide 14, is the same as, or similar to the thickness of the polymer bottom cladding layers 38a and 42a.

Therefore, and recapitulating, the LN block 12 may be placed with Ti-diffused waveguide facing the substrate 30 in order to level the polymer waveguide core 38c and 40 with the LN slab waveguide core (i.e., Ti-diffused waveguide 14) (see FIGS. 9A and 9B). In the case of very thin LN films (see FIG. 9C), the bottom layer of the polymer waveguide core may be etched all the way down to the silicon substrate 30, and the LN block 12 may be placed with the waveguiding region up, assuming that the thickness of the LN is similar to the thickness of the polymer bottom cladding and the core. In this case, and as best shown in FIG. 9C, LNO block 12 is contiguous to substrate 12 and Ti-diffused waveguide 14 is aligned with cores 38c and 40.

Optical fibers, not shown in FIGS. 9A and 9B, transmitting the light signals are coupled, at the right hand side of the device 8, to a channel waveguide formed from an optical polymer material, well known to those skilled in the art. The respective optical fibers are arranged such that the output ends of respective optical fibers is faced with the input ends of the respective cores 101a of the respective input channel waveguides 101 (FIG. 1). In the case of output channel waveguides used 107, the input ends of the respective output fibers is faced with the output ends of the respective cores 107a of the respective output channel waveguides 107. There are standard techniques which may be used for fiber placement on the silicon substrate 30. As an example, optical fibers can be attached using V-grooves formed on the silicon substrate 30, or any other technique known to those skilled in the art. In cases of substrates other than silicon substrate, fiber placement can be performed by other methods well known to those skilled in the art.

The channel waveguide 101a1 is best shown at the left side of FIG. 1. The waveguides 101a1 and 101a2, as well as micro lenses 102a1 and 102a2, are formed from the same material used for the optical polymer core layer 40. The micro lenses 102a1 and 102a2 focus the diverging light beam coming out of the waveguides 101a1 and 101a2 into an in-plane parallel beam, which will propagate through the device 8. Since the propagating light modes are confined vertically in both polymer lens 102a1 (or 102a2) and the LN slab waveguide 14, there is no need for vertical focusing of the beam. Changing the lens radius of curvature enables variation of the focal length of the micro lenses 102a1 and 102a2. The focal length of the micro lenses 102a1 and 102a2 should be adjusted to compensate the beam divergence as it comes out of a part of the channel waveguides.

The channel waveguides preferably comprise three layers of an optical polymer material. The first layer of the channel waveguides and micro-lenses is a lower cladding layer 38a with a lower refractive index as shown in FIG. 9B.

The second layer of the waveguide and micro-lenses combination is the waveguide core with a refractive index higher than that of the lower cladding layer 38a. The second layer 38c of the waveguide and micro-lenses combination includes the waveguides 101a1 and 101a2 and the micro lenses 102a1 and 102a2 as the collimating lenses. Furthermore, the second layer 38c includes the clad layer 101b, the convex lens portion 102c having a high refractive index, and the portion 102d having a low refractive index as shown in FIG. 2.

The third layer of the waveguide and micro-lenses combination is an upper cladding layer 38b with a refractive index lower than that of the second layer 38c, which may be called a core layer and may be the same as or similar to the first layer 38a. In the structure shown in FIG. 9B, the third layer 38b is disposed onto the second layer 38c. The lower and upper cladding layers 38a and 38b may be formed from the same polymer material with an identical refractive index. However, the refractive indexes may be different.

As similar to the waveguide and micro-lenses combination, the first layer of the output waveguide is a lower clad polymer layer 42a, and the second layer thereof is a polymer core layer 40, and the third layer thereof is an upper clad polymer layer 42b. The lower and upper clad layers 42a and 42b are formed from the same polymer material with an identical reflective index that is lower than that of the core layer 40. The second layer of the output waveguide includes focusing lenses 106a and 106a, each constructed from the convex lens portion 106c, the low refractive index portion 106d, the optical waveguides 107a and 107a, and the clad layer 107b (all as best shown in FIG. 2).

The lower cladding layers 38a, 32, and 42a are preferably polymer layers and are deposited directly on the silicon substrate. The LN deflector block 12 is placed over the low cladding polymer layer 32 with the slab waveguide 14 at the bottom of the LN block 12. In this case the LN slab waveguide 14 is self-aligned with the core of the micro-lenses 102a1 and 102a2, namely the second layer 38c, and the core layer 40.

Bottom electrodes 34a1, 34a2, 36b1, and 36b2 for the deflectors 103a1, 103a2, 105a1, and 105a2, as well as the corresponding wirings for the bottom electrodes 34a1, 34a2, 36b1, and 36b2, are made and placed over the first polymer layer 32 in accordance with procedures well known in the art. The bottom electrodes 34a1, 34a2, 36b1, and 36b2 are preferably covered with a thin protective layer 36. The thin protective layer 36 is preferably a sputtered layer of $SiO_2$, or a similar dielectric material deposited by any suitable means. Each of the bottom electrodes 34a1, 34a2, 36b1, and 36b2 is connected to the bottom contact pads 84a1, 84a2, 84b1, and 84b2. Each of the bottom electrodes 34a1, 34a2, 36b1, and 36b2 works as the first and second lower electrodes of the prism pairs 103p and 105p, so the shape of the bottom electrodes 34a1, 34a2, and 36b2 is preferably a triangle (a wedge shape) respectively, as shown in FIGS. 2 and 6. In FIGS. 9–11, four bottom electrodes are depicted and numbered, with the number of the bottom electrodes are to be matched correspondingly with the number of the top electrodes.

The bottom electrodes 34a1, 34a2, 36b1, and 36b2 may be deposited directly under the two-dimensional Ti-diffused waveguide 14 of the LN block 12. In this alternative structural embodiment, the bottom electrodes 34a1, 34a2, 36b1, and 36b2 are then connected, e.g. with solder bumps, to the wiring for the bottom electrodes 34a1, 34a2, 36b1, and 36b2 formed on the bottom polymer layer 32.

Top electrodes 18a1, 18a2, 18b1, and 18b2, and the contact pads 16a1, 16a2, 16b1, and 16b2 connected to the top electrodes 18a1, 18a2, 18b1, and 18b2 are deposited on the LN block 12 in accordance with procedures well known in the art. The contact pads 16a1, 16a2, 16b1, and 16b2 are connected to the deflector electrodes 18a1, 18a2, 18b1, and 18b2 of the deflecting elements 103a1, 103a2, 105a1, and 105a2. In FIGS. 9–11, the contact pads 16a1, 16a2, 16b1, and 16b2 respectively connect to a top electrode of one of the deflectors within the respective deflecting elements 103a1, 103a2, 105a1, and 105a2. More specifically, contact pads 16a1, 16a2, 16b1, and 16b2 respectively electrically, conductively couple to all of the top electrodes of the deflectors within the respective deflecting elements 103a1, 103a2, 105a1, and 105a2 in an actual switching apparatus since the optical switching apparatus has only two channels, namely two input/output ports. Thus, the number of the contact pad increases dependent upon the increase of the number of the channels; namely it increases proportionally to the increase of the number of the input/output ports. In this situation, the contacts pads are separately formed such that the contacts pads are not electrically conductive with each other.

As similar to the bottom electrodes, each of the top electrodes 18a1, 18a2, 18b1, and 18b2 works as the first and second top electrodes of the prism pairs 103p and 105p. The shape of the top electrodes 18a1, 18a2, 18b1, and 18b2 is preferably a triangle (a wedge shape) respectively, as shown in FIGS. 2 and 3. In FIG. 9, three pairs of the prism pair are provided for each deflecting elements. Thus, the number of top electrodes should be six for each of the deflecting elements. In light of the number of top electrodes, the number of bottom electrodes of each deflecting elements should also be six.

The contact pads 16a1, 16a2, 16b1, and 16b2 are connected to microprocessors for controlling the switching, which are mounted in a housing in which the optical switching modules are also located. The control signal lines extended from the microprocessors increase in proportion to the increase of the number of the channels; namely the number of the input/output ports of the optical switching apparatus with optical switching modules.

All of the bottom contact pads 84a1, 84a2, 84b1, and 84b2 are connected to the common ground line (G) not shown in FIGS. 9–11. All of the deflectors used in FIG. 9 of each deflecting elements 103a1, 103a2, 105a1, and 105a2 have the same structure of the deflecting elements shown in FIGS. 2–4.

Alignment frames 44a, 44b, 46a, and 46b are formed in the lower cladding and core polymer layers 38a, 38c, 42a, and 40 with the same mask used for patterning of the channel waveguides and micro-lenses. The purpose of the alignment frames 44a, 44b, 46a, and 46b is engaging, positioning and alignment of the LN block 12 on the substrate 30. The output two-dimensional slab waveguide formed from three optical polymer layers 42a, 40, and 42b couples the light beam outgoing from the LN block 12 with the output fiber for further signal transmission.

The bottom and top electrodes 34a1, 34a2, 36b1, 36b2, 18a1, 18a2, 18b1, and 18b2 are mutually aligned to be on top of each other, as similar to the arrangement shown in FIGS. 2–4. The shapes of the electrodes define the active deflecting elements of a desired design. However, it should be noted that in the case of a relatively thin (about 5–25 μm) deflector, i.e., the height of the deflector block or active deflecting film deposited on a block from an electrically conductive material is small, one of the electrodes (i.e., either the top or the bottom one) can be made from a blanket conductive film, because fringing effects are minimized for thinner films.

In order to apply a control voltage to the top electrodes 18a1, 18a2, 18b1, and 18b2 as previously explained with reference to FIGS. 2–4, the contact pads 16a1, 16a2, 16b1, and 16b2 are formed on the top outside surface of the LN block 12. In order to connect the bottom electrodes 34a1, 34a2, 36b1, and 36b2 with the ground line (G), the contact pads 84a1, 84a2, 84b1, and 84b2 are formed in the area of the top surface of the silicon substrate 30 where the LN block 12 is not placed and is open for further wiring connections to the ground line (G).

Switching of modes from one input channel into one of the output channels is realized by applying voltage to the opposite electrodes, as previously described in reference to FIGS. 2–4. Without applied voltage to any of the top electrodes, the optical signal goes straight through the two dimensional Ti-diffused waveguide 14 without being deflected. The applied voltage changes the refractive index of LN (or any other electro-optic material which is used) between the top and bottom electrodes, which results in deflection of the light beam from its initial path. When the plus voltage is applied to the top electrodes of the deflecting elements 103a1 and the top electrodes of the deflecting elements 105a2, the optical signal is deflected from the deflecting elements 103a1 of the first channel to the deflecting elements 105a2 of the second channel, and also the optical signal that reaches the deflecting elements 105a2 is deflected to the second output port of the output waveguide.

In this manner the crossbar operation can be achieved. Although the switching device depicted in FIG. 9 has only two input channels and two output channels, there are three prism deflectors shown for each input port and there are three prism deflectors for each output port. For (2×2) configuration only one deflector per port on each of the input side and the output side is required to switch the signal between two I/O ports. More deflectors were added in FIG. 9 to show that the integrated switching device structure can be easily extended to any number of I/O ports.

The fabrication process of the optical switching device is explained with reference to FIGS. 10–11. The fabrication process for the switching device shown in FIG. 9 comprises the following three levels: (a) fabrication of the substrate with channel waveguides, micro lenses, bottom electrodes and electrical wiring (level 1); (b) fabrication of the beam deflector from a single crystal LN block, or any other type of bulk or thin film electro-optic material (level 2); and (c) assembly of the deflector block on the substrate (level 3).

Level 1: Preparation of the Substrate with Channel Waveguides, Micro Lenses, Bottom Electrodes and Electrical Wiring FIG. 10 shows a schematic process flow for fabrication of the substrate on which the deflecting device is mounted. As shown in FIG. 10A, a silicon wafer 400 is provided for use as a substrate. The silicon wafer 400 may be with or may not be with a thin silicon dioxide layer terminating on the surface of the substrate. Then, a low cladding layer (PL 1) 410 is deposited on the silicon wafer 400. To form the low cladding layer 410, low cladding optical polymer material is preferably spin coated on the silicon wafer 400. The thickness of the low cladding layer 410 may vary from 1 to 30 µm depending on the waveguide design. The preferable thickness of the low cladding layer 410 for one embodiment would be in the range 5–15 µm.

As shown in FIG. 10B, recess formation process is performed. A recess 420 is formed on the top surface of the spin coated low cladding layer 410. In this process, the silicon wafer 400 is first coated with photoresist (PR, not shown in FIG. 10) and is patterned with photolithography. An etching process, e.g., $O_2$ plasma-etching process is applied to form the recess 420 through the opening in the masking photoresist layer. This step is for vertical leveling of the polymer waveguide cores 38c and 40 and the LN slab waveguide core 14. This step is optional and can be skipped if a slight misalignment is not critical for the mode coupling at the waveguide/deflector block interface.

In FIG. 10C, the bottom electrodes 34a1, 34a2, 36b1, and 36b2 and the contact pads 84a1, 84a2, 84b1, and 84b2 with the wiring, not shown in FIG. 9, are formed on the bottom surface in the recess 420. Metal layer(s) are deposited on the bottom cladding surface 410 to form bottom electrodes, contact pads, and the wiring. The deposition of the metal layers may be by sputtering or plating or any other suitable way. Any electrically conductive material can be used as the bottom electrodes, the contacts pads, and the wiring. Main restrictions for the material to be used as the metal layers are compatibility with the underlying polymer layer and the material etching possibilities. Furthermore, the bottom electrodes can be deposited directly on the under surface of the LN block 12 in the integration level 2 as will be explained later. In this process, the photoresist is applied over the low cladding layer 410 and patterned with photolithographically. The metal pattern for the metal layers is formed through the mask by either wet or dry etch. A lift-off process, well known to those skilled in the art, may also be used to form the metal pattern.

As shown in FIG. 10C, deposition of the bottom electrode (BE) protection layer 18 is done. This is an arbitrary step and may not be necessary if there is no need to protect the BE. The protection layer 18 protects the bottom electrodes 34a1, 34a2, 34b1, and 34b2 from corrosion and shorting during the operation at higher voltages. The protection layer 18 is formed by using sputtering technology. The protection layer 18 is made of $SiO_2$ or any other appropriate dielectric material. It is a thin $SiO_2$ layer; preferably having a thickness ranging from about 0.1 to about 5.0 µm.

The BE protection layer 18 has a pattern matching the shape of the LN block 12. The process of forming the protection layer 18 includes, as similar to the other process, deposition of photoresist layer onto the low cladding layer to cover the bottom electrodes, and photolithography. For instance, the $SiO_2$ protection layer 18 may be dry etched in $CF_4/H_2$ plasma or any appropriate wet or dry etching method. Addition of the reducing agent $H_2$ in the $CF_4$ plasma allows increase of the etch selectivity between silica and the polymer of the low cladding layer 410.

As shown in FIG. 10D, the next step is a spin coating deposition of the core polymer layer 430 having a higher refractive index than that of the bottom-cladding layer 410. The thickness of the core polymer layer 430 can be varied according the design rules from about 1 µm to about 30 µm. The preferable thickness range for the core polymer layer is about 3–10 µm.

As shown in FIG. 10E, the core and bottom cladding layers 410 and 430 are patterned through photolithography with a single mask using for example $O_2$ plasma etch. The channel waveguide core 38c including the micro lenses 102a1 and 102a2, the alignment frame 44a, 44b, 46a, and 46b, and the output waveguide core 40 are formed in the two polymer layers 410 and 430.

The upper cladding layers 38b and 42b possessing a low refractive index material are deposited and patterned in the same manner as the lower cladding and core layers so as to open the front side of the micro-lenses and the output slab-waveguide. The top plane view of the polymer waveguide and micro-lenses is similar to the top plane view of the output waveguide as shown on the right side of FIG. 9A. If required, grooves or trenches for placing optical fibers may be formed on the substrate 400 at the left side of the polymer waveguides and micro-lenses, and at the right side of the output waveguide for fiber placement.

Level 2: Preparation of the LN Block for the Light-Deflecting Device

FIG. 11 shows a process flow of fabrication of the deflecting device. As mentioned above, this is an example of a deflector block fabrication and it is not restricted to LN. Any other bulk or thin film material with OE properties may be used.

In FIGS. 11A and 11B, in order to fabricate the LN deflecting device in this example, a 100 or 75 mm z-cut LN wafer 500 is prepared. The thickness of the wafer 500 maybe either about 1 or about 0.5 mm depending on the handling and polishing convenience of the wafer 500. Such LN wafer (LNO crystals) is available from Crystal Technologies, Inc.

Using the LN wafer 500 rather than sputtering it onto a substrate is cost effective. The thickness of the common waveguide 104 and the slab type waveguide 103b required in the optical switching apparatus is relatively high. The two dimensional (2D) waveguides 14 are formed on top of the LN wafer 500 by titanium indiffusion. The processing conditions such as Ti-layer thickness, annealing time and temperature can be adjusted according to the required waveguide design that depends on the wavelength of the light used. In a preferred embodiment, Ti-layer 510 of 700 Å thickness is blank sputtered on the −Z surface of the LN wafer 500, as shown in FIG. 11A. Then, Ti indiffusion is performed in an annealing furnace at a temperature of 1050° C. for 8 hours, as shown in FIG. 11B. The resulting Ti-diffused waveguide 520 was simulated to support only single mode propagation for a 1.3–1.5 µm light. The insertion losses are expected to be less than 0.5 dB/cm.

In the next step as shown in FIG. 11C, a thin $SiO_2$ film 530 is deposited on the surface of the LN wafer 500. The thickness of the thin $SiO_2$ film 530 is 0.1–1 µm. It may be less than 0.1 µm. The thin film layer 530 serves as an isolation of the Ti-diffused waveguide 14 from the prism electrodes 34a1, 34a2, 34b1, and 34b2, and also as the upper cladding layer for the LN slab waveguide 14.

As shown in FIG. 11C, the LN wafer 500 is then diced into blocks which are going to be used as active elements in deflecting devices. In the dice or cleave step, the silicon substrate 30 is severed to many pieces of the desired device shape. The dicing or cleaving procedure may also be applied at any earlier stage of the processing, depending on the general requirements. Obviously, the outside dimension of the LN block separated matches with the open space formed by the alignment blocks 44a, 44b, 46a, and 46b with manufacturing allowances.

As shown in FIG. 11D, the front and rear sidewalls of the severed LN block 540 are polished with an optical quality for coupling of incoming and outgoing light modes.

In the next step shown in FIG. 11E, the LN block 540 may be thinned by backside lapping and polishing. The block thickness may be in the range 10–500 μm. Since LN is a very brittle material, the limitation on the block thickness are imposed from handling and processing difficulties.

After the blocks are thinned, as shown in FIG. 11F, a metal film 550 is sputtered on the surface of the LN block 540 for making the top electrodes, the contact pads, and the wiring for the top electrodes and the contact pads.

FIG. 11F shows a side view of the final form of the LN block 540 with the Ti indiffused slab waveguide 520 and the metal layer 550 for the top electrodes, etc. After forming the metal layer 550 by sputtering on the backside (in FIG. 11F it is the topside) of the LN block 540, a photoresist layer is rolled on the topside of the LN block 540. Then, lithography is performed and the metal layer is etched to form the top electrodes on the LN block 540.

Level 3: Assembly of the Deflector Block on the Substrate

The LN block 540 is inserted into the alignment frame 44a, 44b, 46a, and 46b formed in the polymer layers 410 and 430. The placement of the block 540 may be realized by the flip-chip bonding technique. The LN block 540 is attached to the substrate made through the process shown in FIG. 10 with an adhesive material and leveled and registered in order to adjust the polymer and LN waveguides. The adhesive material is, e.g., an epoxy material. It is coated to the under surface of the LN block 540, preferably the surface of thin $SiO_2$ film layer 530.

By the practice of the fabrication process of an optical switching device there is provided a hybrid integration on a single substrate of the switching matrix and two-dimensional microoptics. The switching matrix is fabricated from a single block electro-optic material which incorporates cascaded light beam deflecting elements for the input channels, slab waveguide for non-blocking transmission of the signal between the input/output deflectors, and output deflecting elements to couple the rerouted signals into the output waveguides. Two-dimensional micro-optics made from optical polymer layers for coupling of the input and output fibers in and out of the switching matrix. The principles of the optical switching device are based on electro-optic switching principle; i.e., there is high potential for very fast switching (~40 Gb/s and higher). A 2×2 switch fabricated with the technique of embodiments of the optical switching device was measured to have a switching speed of less than about 50 microseconds. There are no movable switching parts; thus, the optical switching device is highly durable and reliable. There are no heating electrodes, thus there are no thermal management problems. The fabrication processes explained above have a high compatibility with existing semiconductor processing techniques and equipment, and the switching matrix on a single block allows low cost fabrication of deflectors for a large number of I/O channels. Several switching devices may be fabricated on a single wafer, and thus, there would be a high yield at a lower cost.

Adiabatic Coupling to Optical Fiber

Referring now to FIGS. 12A–15D for additional embodiments of the invention, there is seen in FIGS. 12A–15D a coupling structure for coupling an optical fiber to any suitable structure or device. The example in FIGS. 12A–15D of adiabatic coupling to a switching device is given by way of example only. The coupling structure with a tapered lens shape may be applied in the case of any thin film optical device which requires coupling of a standard optical fibers with core diameter of 7–9 μm into a device with a waveguiding film significantly thinner than that, for example with a core layer thickness of 1–5 μm. Besides switching may be any function which involves propagation of a collimated light beam through a thin film waveguide. This includes, but is not limited to, beam re-routing, active or passive, beam splitting, beam blocking, beam attenuation, polarization functions, etc.

FIG. 12A shows a top plan view of the coupling structure. FIG. 12B shows a vertical sectional view of the coupling structure in FIG. 12A. FIGS. 12A and 12B illustrate only a portion of an entire switching device, more specifically a part of one channel of the optical switching device. It is to be understood that for explanation purposes, other parts of the switching mechanism, e.g. electrodes, have been omitted in FIGS. 12A and 12B and the figures following FIGS. 12A and 12B.

FIGS. 12A and 12B illustrate a channel waveguide 502 and a planar microlens 503, each including a common core layer 507. The waveguide 502 is used as an input port for a light beam exiting from an open end of an optical fiber 500. The open end surface of the waveguide 502 faces toward an open end surface of a core layer 514 supported by cladding layer 499 and covered by cladding layer 513 of the optical fiber 500. The microlens 503 is used for collimation and optically coupling via planar waveguide 502 a light beam from the core layer 514 of the optical fiber 500 into a core at the thin film optical switching device 504, as previously indicated. As shown in FIG. 12A, a light beam which is collimated by the microlens 503 and converted into a parallel beam 505 propagates through the device 504. The microlens 503 and the waveguide (WG) 502 including lower cladding layer 506 are directly supported by a common substrate 512. The lower cladding layer 506 is deposited on the common substrate 512 by any suitable means. To form a layered assembly comprising core layer 511, upper cladding layer 510, and substrate 509, the core layer 511 and the upper cladding layer 510 are formed on the substrate 509. The formed layered assembly is then rotated 180° and disposed such that the core layer 511 is contactedly supported by the lower cladding layer 506, as shown in FIG. 12B. Stated alternatively, after the core layer 511 and the cladding layer 510 are formed on the substrate 509, the formed layered combination is moved or rotated upside down for conveniently attaching the core layer 511 to the lower cladding layer 506 on the common substrate 512. The bottom plane of the core layer 511 is leveled with the bottom plane of the core layer 507 of the microlens 503 and the waveguide 502, as best shown in FIG. 12B. The core layer 507 supports upper cladding layer 510a.

The fabrication processes explained with respect to FIGS. 9–11 are applicable to the structure shown in FIGS. 12A and 12B. In contrast, however, the thickness of the common core layer 507 of the microlens 503 and the planar waveguide 502 is greater than the thickness of the core layer 511. In FIGS. 9–11, the thickness of the core layer of the microlens and the thickness of the core layer of the common waveguide are essentially equal or the same. In order to hold or maintain an excellent coupling efficiency between the optical fiber 500 and the optical switching device, the thickness of the core layer 507 of the waveguide 502 and the microlens 503 preferably ranges from about 2 to about 16 μm, more preferably from about 6 to about 10 μm, because the diameter or thickness of the core 514 of the standard single mode optical fiber 500 used for telecommunications is about 9 μm.

As previously indicated, when LiNbO$_3$ (LN) is used as an EO material in an optical switching device, it requires a high driving voltage, e.g. at least 200 V, applied between the top and bottom electrodes to effectively function or operate the EO material for its optical purposes, especially since EO coefficient of LN crystals is relatively low. Thus, it is preferable, where LiNb$_3$ is used as an EO material, that the thickness of LiNbO$_3$ be as thin as possible. In some cases when very thin LNO is used, the height of the Ti-indiffused core layer may be reduced to 2–5 μm. In this case, the coupling of the normal 9 μm. fibers into the core of 2–5 μm. can lead to significant undesired losses of optical intensity. The coupling structure with a tapered lens disclosed herein can improve the coupling efficiency.

As an EO material, there are additional available materials, such as PLZT or PZT. These materials demonstrate an excellent EO performance, with their EO coefficients exceeding that of LN by an order of magnitude. At the present time, no feasible technology is available for enabling deposition of transparent and crystalline PLZT films thicker than from about 1 to about 5 μm (e.g., such as about 3–4 μm). The transparency and crystalline of PLZT film is for good waveguiding characteristics and for good EO characteristics, respectively.

As noted above, the core dimension of a standard single mode optical fiber used for telecommunications is about 9 μm in diameter. The thickness of the core layer 507 of the waveguide 502 and the microlens 503 is preferably from about 6 to about 9 μm to generally match the size of the core layer 514 of the optical fiber 500. Thus, when the light output from the optical fiber 500 is passed into and through the core layer 507 of the waveguide 502 and the microlens 503 and reaches the lead facial plane of the core layer 511, which preferably comprises thin PLZT or PZT film (e.g., from about 1 μm to about 5 μm in thickness, preferably from about 3 μm to about 4 μm), the thickness differential (e.g., 1 μm to 10 μm, preferably 3 μm to 6 μm) between the core layer 507 and the core layer 511 causes a strong loss of the signal power of the light. The gap between the end plane of the core layer 507 of the microlens 503 and the lead plane, in view of propagation direction of the light, of the core layer 511 may be referred to as the lens-device interface.

Referring now to FIGS. 13A and 13B, there is shown a coupling structure with a tapered lens for coupling of an optical fiber to a suitable device. FIG. 13A shows a top plan view of the coupling structure. FIG. 13B shows a sectional view of the coupling structure in FIG. 13A along the plane 13B—13B and in direction of the arrows in FIG. 13A. FIGS. 13A and 13B illustrate only a part of an entire switching device, and shows only a part of one channel of the optical switching device. For ease of explanation, other parts of switching mechanism, e.g. electrodes, are omitted in FIGS. 13A and 13B. The same reference numbers assigned in FIGS. 12A and 12B and FIGS. 13A and 13B denote the same elements therein. The coupling structure shown in FIGS. 13A and 13B is a structure which allows low optical loss coupling of a complete system of "fiber"—"channel WG"—"optic device".

As shown in FIGS. 13A and 13B, the standard planar channel waveguide 502 and the planar microlens 503 are deposited on the lower cladding layer 506, which is deposited on the common substrate 512 at one edge. The stacked core layer 511, the upper cladding layer 512, and the substrate 509 are placed on the common substrate 512 at the other edge of the common substrate 512. With respect to the stacking process, more specifically the fabrication process, the processes described with reference to FIGS. 9–11 are applicable to this structural stacking process.

The optical fiber 500 is arranged at the one edge of the common substrate 512. The optical fiber 500 is the standard single mode optical fiber used for voice and data communications. The diameter of the core 514 of the optical fiber is preferably about 9 μm. The thickness (height) and width of the core layer 507 of the waveguide 502 are preferably about 6 to 10 μm. The shape of the core 514 of the optical fiber 500 is cylindrical and circular in cross section. The end surface of the core layer 514 of the optical fiber 500 is arranged to face the lead surface of the core layer 507 of the waveguide 502 in order to essentially cover the whole area of the end surface of the core layer 514 by the area of the lead surface of the core layer 507, by a well known positioning means, not shown in FIGS. 13A and 13B.

In FIGS. 13A and 13B, in addition to the microlens 503 as a first collimation lens, a second collimation lens 520 is provided. The collimation system in FIGS. 13A and 13B is, thus, formed from three parts: input channel waveguide 502, the first collimating lens 503, and the second collimating lens 520. Refractive index (RI) matching fluid or gel 522 with a RI slightly lower than the RI of core layer 507 is deposited as shown in order to reduce any optical back-reflections from the interfaces which the optical beam 505 passes through. The set of two lenses 503 and 520 allows an increase in total curvature for a more effective collimation of the light beam 505.

The material used for fabrication of the waveguide 502, the first collimating lens 503, an the second collimating lens 520 may be any suitable material, e.g., photosensitive or regular polyimide or epoxy, or silica. If the material used is photodefinable, then the shape or outline or contour of these elements 502, 503, and 520 is directly formed through photolithography and development processes. If the material is not photodefinable, then the photoresist layer is patterned first, followed by etching process to transfer the pattern into these elements including the core and cladding layers.

The core layer 507 of the second lens 520 has a tapered surface 520a. The tapered surface 520a is provided with the second lens 520 such that the top surface of the core layer 507 of the second lens 520 slopes or tapers downwardly toward the bottom surface of the core layer 507. Stated alternatively, core layer 507 slopes downwardly at an angle of about 1–10 degrees preferably about 1–5 degrees) from the input side of the second collimating lens 520 toward the output side of the second collimating lens 520, in view of the propagation direction of the light beam 505. By providing the tapered surface 520a with the second collimating lens 520, the thickness of the core layer 507a ranges from about 1 μm to about 6 μm, more preferably from about 2 μm to about 5 μm, most preferably from about 3 μm to about 4 μm. Thus, the core layer 507 of the second collimating lens 520 is reduced from a thickness of about 6–10 μm at the input end of the second collimating lens 520 to a thickness of about 3 μm to 4 μm, the thickness core layer 507a.

As shown in FIG. 13A, since the second collimation lens 520 has no curvature at the portion where the tapered surface 520a is formed, the tapered surface 520a can be made very uniform in the direction of a channel in the optical switching device.

By tapering of the core layer 507 of the second collimation lens 520 from a larger thickness, say 10 μm, to a smaller thickness, such as about 3–4 μm, enables a continuous reduction of the optical mode field diameter while passing through the core layer 507 of the second collimation lens 520. The shape of the tapered surface 520a may be custom designed specifically for every particular case and should be taken into consideration in the initial and final thickness of the core layer 507 of the second collimation lens 520 and the waveguide 502.

The theory of the shapes of the tapered waveguide has been developed previously and can be found in the literature (see, e.g., C. T. Lee et al., Journal of Lightwave Technology 15 (1997) 403; H. S. Kim et al., IEEE Journal of Quantum Electronics 29 (1993) 1158; Y. Shani et al., IEEE Journal of Quantum Electronics 27 (1991) 556). A very abrupt taper would lead to high irradiation losses and therefore would not give the desired results. In a preferred embodiment, the taper of the core layer 507 is adiabatic, which means that the occupations of the optical modes of the system does not change as the waveguide structure changes. There are several shapes of the taper which can be adopted to the shape of the taper 520a of the core layer 507 of the second collimation lens 520. One example would be a parabolic taper shape. It can provide a nearly adiabatic transition of the mode from a larger diameter to a smaller one. Even a long linear slope can reduce the mode diameter without substantial optical irradiation. The length of the tapered surface 520a, which allows adiabatic reduction of the mode field size (the height in the present case) from about 9–10 μm to about 3–4 μm, ranges from about 30 μm to about 140 μm, more preferably from about 50 μm to about 100 μm.

Fabrication of the tapered surface 520a can be realized by several techniques. One technique is to use photopatternable materials and gray-scale masking. A gray-scale mask can have a given profile of optical densities which enables transfer of a tapered shape into a photodefinable thin film layer. Where a material for the core layer of the microlens is not photodefinable, the pattern transfer from a photoresist layer into the material can be realized by means of dry etching technique. In this case the tapered pattern is first formed in a photoresist layer followed by the dry etch with a thoroughly adjusted etch selectivity between the photoresist and the underlying material layers.

FIGS. 14A–14D illustrate a process flow for fabrication of a tapered structure, more specifically a process for a photodefinable material of the core layer. As shown in FIG. 14A, after the cladding layer 506 is deposited on the common substrate 512, a photodefinable material 507b for the core layer 507 of the channel waveguide 502, the first collimating lens 503, and the second collimating lens 520 is deposited on the cladding layer 506. The cladding layer 506 may be either a polymer material or a silica material, depending on the particular needs.

Then, through a gray-scale mask (not shown) with patterns for the channel waveguide 502, the first collimation lens 503, and the second collimation lens 520, the photodefinable material 507b is exposed by a light. Then, the photodefinable material 507b is etched, and thus the channel waveguide 502, the first collimation lens 503, and the second collimation lens 520 are formed as shown in FIG. 14B. Here, the gray-scale mask includes a gray scale pattern corresponding to the shape of tapered surface 520a. The gray-scale pattern is a pattern having a characteristic in which an optical transparency gradually decreases as a portion in the pattern changes in a propagation direction of a light coming out from an optical fiber in the channel of the optical switching device. By using the gray-scale pattern, the tapered surface 520a of the core layer 507 is formed with the core layer 507 of the second collimation lens 520, as shown in FIG. 14B.

Thereafter, a material 530 for the top cladding layer 510a is deposited as shown in FIG. 14C, and patterned with a regular binary mask having the same pattern of the underlying waveguide and lenses, except a gray-scale for the taper. Then, the material 530 is exposed to a light. Finally, the material 530 is etched, and thus the upper cladding layer 510a is formed on the core layer 507 as shown in FIG. 14D. It should be noted that the upper cladding mask and the core layer mask should be perfectly aligned in order to avoid making a step between the core layer 507 and the upper cladding layer 510a.

Obviously, the processes explained with FIGS. 14A–14B are similar to a part of the fabrication processes described with reference to FIGS. 9–11. The difference therebetween is a mask for the core layer 507. Thus, an optical switching apparatus with a tapered structure may be easily applicable to the structure explained and illustrated in FIGS. 1–12 but with a much thinner core layer for a common waveguide.

FIGS. 15A–15D illustrate another process flow for fabrication of the tapered structure, including tapered surface 520a. As shown in FIG. 15A, after the cladding layer 506 is deposited on the common substrate 512, a material 507b for the core layer 507 of the channel waveguide 502, the first collimating lens 503, and the second collimating lens 520 is deposited on the cladding layer 506. The cladding layer 506 maybe either from a polymer material or a silica depending on the particular needs. Through a gray-scale mask with a pattern for the tapered surface 520a, the material 507b is exposed by a light. Then, the material 507b is etched, producing the tapered structure in FIG. 15B including the tapered surface 520a. Subsequently, the material 530 for the cladding layer 510a is deposited over the core layer 507b. The profiles of the channel waveguide 502, the first collimation lens 503, and the second collimation lens 520 are formed by dry etching through the upper cladding layer 508a and the core layer 507b. It is noted that the etch process should be optimized so that the etched interface may become smooth.

Alternatively, in order to allow a low loss coupling of a collimated light beam from an optical fiber into a thin film optical device, an optical fiber is provided with a tapered end having a diameter of 3–4 μm and with a shorter channel waveguide and microlens having a thickness of 3–4 μm and a width of 3–4 μm. Furthermore, as means for gathering a light power from the core layer of the microlens into the core layer of the common waveguide, a prism or a grading may be provided between the core layer of the microlens and the core layer of the common waveguide. The tapered core layer of the optical fiber, the tapered collimation lens, the prism, and the grading may function as means for allowing the core layer of the common waveguide to be about 3–4 μm in thickness or to be PLZT or PZT of about 3–4 μm in thickness. Thus, according to embodiments of the present invention, PLZT or PZT can be used as an EO material for an optical switching device.

It is to be understood that this invention is not limited to those embodiments and modifications described in the specification. Modifications and variations can be made one skilled in the art without departing from the sprit and scope of the invention. Moreover, any one or more features of any embodiment of the invention may be combined with any one or more other features of any other embodiment of the invention, without departing from the scope of the invention.

What is claimed is:

1. A coupling structure for optically coupling an optical fiber to an optical device comprising:

a core assembly mounted on a substrate having a structure defining a first core layer having a face at an end thereof for receiving light from the optical fiber and having a first thickness substantially equal to the diameter of the optical fiber, a second core layer having a second thickness which is thinner than the first thickness of the first core layer, a tapered core layer disposed between the first core layer and the second core layer and a lens disposed between said first core layer and said tapered core layer.

2. The coupling structure of claim 1 wherein a tapered surface of the tapered core layer extends downwardly from the first core layer to the second core layer.

3. The coupling structure of claim 2 wherein said downward slope is at an angle in the range of about 1 degree to about 10 degrees.

4. The coupling structure of claim 1 wherein the tapered core layer is integrally bound to the first core layer and the second core layer.

5. The coupling structure of claim 1 wherein the second core layer is a core layer of a slab waveguide comprising PLZT or PZT.

6. The coupling structure of claim 5 wherein the second core layer has a thickness of about 3–4 $\mu$m.

7. The coupling structure of claim 1 wherein said taper core layer is shaped to provide adiabatic coupling of the light.

8. The coupling structure of claim 1 wherein said tapered core comprises a parabolic surface.

9. The coupling structure of claim 1 wherein the width of said tapered core is substantially constant.

10. The coupling structure of claim 1 further comprising a refractive index matching fluid or gel surrounding the interfaces between the first, second and tapered cores.

11. The coupling structure of claim 10 wherein said refractive index matching fluid or gel fills any gaps between adjacent cores such that back reflections from the interfaces are reduced.

12. An optical switch having an input comprising an array of a plurality of substantially identical core assemblies of claim 1.

13. The optical switch of claim 12 wherein said second core is part of a slab waveguide comprising an electro-optical material, and further comprising a plurality of deflector electrodes coupled to said second core for changing the direction of light transmitted through said slab waveguide.

14. An optical device, comprising:

a first waveguide with a first core layer, said first core layer having a face at an end thereof for receiving light from an optical fiber;

a lens optically coupled to said first waveguide for collimating light received from said first waveguide, said lens having a second core layer that has a thickness which is substantially equal to the thickness of the first waveguide;

a second waveguide with a third core layer in which the collimated light propagates, said second waveguide having a thickness which is substantially smaller than the thickness of said first waveguide; and a tapered optical coupling structure positioned between said lens and said second waveguide for allowing the third core layer to be of smaller thickness, wherein said first waveguide, said lens, said second waveguide and said tapered optical coupling structure are all mounted on a common substrate.

15. The coupling structure of claim 14, wherein the second core layer comprises PLZT or PZT.

16. The coupling structure of claim 14, wherein the third core layer has a thickness about 3–4 $\mu$m.

17. The optical device of claim 14 wherein said second waveguide is a slab waveguide comprising an electro-optical material, said slab waveguide having at least one input at one end thereof and a plurality of outputs at the opposite end thereof, and further comprising at least one pair of deflector electrodes coupled to said slab waveguide adjacent to said at least one input for controllably deflecting light from said input to a selected output.

18. A coupling structure for optically coupling an optical fiber to an optical device comprising:

a core assembly mounted on a substrate having a structure defining a first core layer having a face at an end thereof for receiving light from the optical fiber and having a first thickness substantially equal to the diameter of the optical fiber, a second core layer having a second thickness which is thinner than the first thickness of the first core layer, a tapered core layer disposed between the first core layer and the second core layer and a lens disposed between said first core layer and said second core layer, wherein said lens comprises two curved lens surfaces.

* * * * *